US009596519B2

(12) United States Patent
Endo

(10) Patent No.: US 9,596,519 B2
(45) Date of Patent: Mar. 14, 2017

(54) WIRELESS TRANSMISSION TERMINAL, WIRELESS RECEIVING TERMINAL, WIRELESS COMMUNICATION SYSTEM, WIRELESS COMMUNICATION METHOD, AND COMPUTER READABLE STORAGE DEVICE

(71) Applicant: OLYMPUS CORPORATION, Tokyo (JP)

(72) Inventor: Takahisa Endo, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/704,409

(22) Filed: May 5, 2015

(65) Prior Publication Data
US 2015/0237408 A1 Aug. 20, 2015

Related U.S. Application Data

(63) Continuation of application No. PCT/JP2013/075326, filed on Sep. 19, 2013.

(30) Foreign Application Priority Data

Nov. 8, 2012 (JP) .................... 2012-246227

(51) Int. Cl.
*H04W 4/06* (2009.01)
*H04N 21/6405* (2011.01)
(52) U.S. Cl.
CPC ............... *H04N 21/6405* (2013.01)
(58) Field of Classification Search
None
See application file for complete search history.

(56) References Cited

U.S. PATENT DOCUMENTS

2004/0224698 A1* 11/2004 Yi ................. H04W 76/02
455/450
2012/0106427 A1* 5/2012 Nakae ............... H04L 12/1868
370/312

FOREIGN PATENT DOCUMENTS

JP 06-260997 A 9/1994
JP 2007-235362 A 9/2007
(Continued)

OTHER PUBLICATIONS

International Search Report dated Oct. 22, 2013, issued in corresponding application No. PCT/JP2013/075326.
(Continued)

*Primary Examiner* — Edan Orgad
*Assistant Examiner* — Sithu Ko
(74) *Attorney, Agent, or Firm* — Westerman, Hattori, Daniels & Adrian, LLP

(57) ABSTRACT

A wireless transmission terminal wirelessly transmits data in a multicast manner to wireless receiving terminals that set whether to wirelessly transmit responses for wirelessly received data, wirelessly transmit priority information representing a priority of a reception side terminal, and serve as any one of response-enabled terminals for which wireless transmission of the responses is enabled and response-disabled terminals for which wireless transmission of the responses is disabled. The wireless transmission terminal includes: a wireless communication unit; a storage unit; and a control unit configured to store the priority information in the storage unit in correlation with identification information for identifying the wireless receiving terminal having wirelessly transmitted a connection request for receiving data wirelessly transmitted in a multicast manner when the connection request and the priority information have been wirelessly received in the wireless communication unit.

10 Claims, 20 Drawing Sheets

(56) References Cited

FOREIGN PATENT DOCUMENTS

| JP | 2008-017306 A | 1/2008 |
| JP | 2012-070113 A | 4/2012 |
| WO | 2011/010468 A1 | 1/2011 |

OTHER PUBLICATIONS

"Part 11: Wireless LAN Medium Access Control (MAC) and Physical Layer (PHY) Specifications", Local and Metropolitan Area Networks-Specific Requirements, IEEE Standards Association, Mar. 29, 2012, cited in Specification, (34 pages).

* cited by examiner

*FIG. 7*

| RECEIVER No | MAC ADDRESS | PRIORITY LEVEL | RESPONSE TRANSMISSION PERIOD | RESPONSE RECEPTION STATE |
|---|---|---|---|---|
| 1 | MAC_a | 1 | 1 | 0 |
| 2 | MAC_b | 3 | 2 | 0 |
| 3 | 0 | 0 | 0 | 0 |
| 4 | 0 | 0 | 0 | 0 |
| 5 | 0 | 0 | 0 | 0 |
| 6 | 0 | 0 | 0 | 0 |
| N | 0 | 0 | 0 | 0 |

*FIG. 8*

| Slot_No | RESPONSE DELAY TIME[$\mu$s] | USE STATE |
|---|---|---|
| 1 | 50 | 1 |
| 2 | 100 | 1 |
| 3 | 150 | 0 |
| 4 | 200 | 0 |
| 5 | 250 | 0 |

*FIG. 13*

| RECEIVER No | MAC ADDRESS | PRIORITY LEVEL | RESPONSE TRANSMISSION PERIOD | RESPONSE RECEPTION STATE |
|---|---|---|---|---|
| 1 | MAC_a | 1 | 1 | 0 |
| 2 | MAC_b | 3 | 2 | 0 |
| 3 | MAC_c | 2 | 3 | 0 |
| 4 | 0 | 0 | 0 | 0 |
| 5 | 0 | 0 | 0 | 0 |
| 6 | 0 | 0 | 0 | 0 |
| N | 0 | 0 | 0 | 0 |

*FIG. 14*

| Slot_No | RESPONSE DELAY TIME[$\mu s$] | USE STATE |
|---|---|---|
| 1 | 50 | 1 |
| 2 | 100 | 1 |
| 3 | 150 | 1 |
| 4 | 200 | 0 |
| 5 | 250 | 0 |

FIG. 15

| RECEIVER No | MAC ADDRESS | PRIORITY LEVEL | RESPONSE TRANSMISSION PERIOD | RESPONSE RECEPTION STATE |
|---|---|---|---|---|
| 1 | MAC_a | 1 | 1 | 0 |
| 2 | MAC_b | 3 | 2 | 0 |
| 3 | MAC_c | 2 | 3 | 0 |
| 4 | MAC_d | 2 | 4 | 0 |
| 5 | MAC_e | 3 | 5 | 0 |
| 6 | 0 | 0 | 0 | 0 |
| N | 0 | 0 | 0 | 0 |

FIG. 16

| Slot_No | RESPONSE DELAY TIME[$\mu$s] | USE STATE |
|---|---|---|
| 1 | 50 | 1 |
| 2 | 100 | 1 |
| 3 | 150 | 1 |
| 4 | 200 | 1 |
| 5 | 250 | 1 |

*FIG. 18*

| RECEIVER No | MAC ADDRESS | PRIORITY LEVEL | RESPONSE TRANSMISSION PERIOD | RESPONSE RECEPTION STATE |
|---|---|---|---|---|
| 1 | MAC_a | 1 | 1 | 0 |
| 2 | MAC_b | 3 | 0 | 0 |
| 3 | MAC_c | 2 | 3 | 0 |
| 4 | MAC_d | 2 | 4 | 0 |
| 5 | MAC_e | 3 | 5 | 0 |
| 6 | MAC_f | 2 | 2 | 0 |
| N | 0 | 0 | 0 | 0 |

FIG. 20

| RECEIVER No | MAC ADDRESS | PRIORITY LEVEL | RESPONSE TRANSMISSION PERIOD | RESPONSE RECEPTION STATE |
|---|---|---|---|---|
| 1 | MAC_a | 1 | 1 | 0 |
| 2 | MAC_b | 3 | 0 | 0 |
| 3 | MAC_c | 2 | 3 | 0 |
| 4 | MAC_d | 2 | 4 | 0 |
| 5 | MAC_e | 3 | 0 | 0 |
| 6 | MAC_f | 2 | 2 | 0 |
| 7 | MAC_g | 2 | 5 | 0 |
| N | 0 | 0 | 0 | 0 |

FIG. 21

| RECEIVER No | MAC ADDRESS | PRIORITY LEVEL | RESPONSE TRANSMISSION PERIOD | RESPONSE RECEPTION STATE |
|---|---|---|---|---|
| 1 | MAC_a | 1 | 1 | 0 |
| 2 | MAC_b | 3 | 0 | 0 |
| 3 | MAC_c | 2 | 3 | 0 |
| 4 | MAC_d | 2 | 4 | 0 |
| 5 | MAC_e | 3 | 0 | 0 |
| 6 | MAC_g | 2 | 5 | 0 |
| 7 | 0 | 0 | 0 | 0 |
| N | 0 | 0 | 0 | 0 |

FIG. 22

| Slot_No | RESPONSE DELAY TIME[µs] | USE STATE |
|---|---|---|
| 1 | 50 | 1 |
| 2 | 100 | 0 |
| 3 | 150 | 1 |
| 4 | 200 | 1 |
| 5 | 250 | 1 |

*FIG. 23*

| RECEIVER No | MAC ADDRESS | PRIORITY LEVEL | RESPONSE TRANSMISSION PERIOD | RESPONSE RECEPTION STATE |
|---|---|---|---|---|
| 1 | MAC_a | 1 | 1 | 0 |
| 2 | MAC_b | 3 | 2 | 0 |
| 3 | MAC_c | 2 | 3 | 0 |
| 4 | MAC_d | 2 | 4 | 0 |
| 5 | MAC_e | 3 | 0 | 0 |
| 6 | MAC_g | 2 | 5 | 0 |
| 7 | 0 | 0 | 0 | 0 |
| N | 0 | 0 | 0 | 0 |

*FIG. 24*

| Slot_No | RESPONSE DELAY TIME[$\mu s$] | USE STATE |
|---|---|---|
| 1 | 50 | 1 |
| 2 | 100 | 1 |
| 3 | 150 | 1 |
| 4 | 200 | 1 |
| 5 | 250 | 1 |

WIRELESS TRANSMISSION TERMINAL, WIRELESS RECEIVING TERMINAL, WIRELESS COMMUNICATION SYSTEM, WIRELESS COMMUNICATION METHOD, AND COMPUTER READABLE STORAGE DEVICE

CROSS REFERENCE TO RELATED APPLICATIONS

This application is a continuation application based on a PCT Patent Application No. PCT/JP2013/075326, filed Sep. 19, 2013, whose priority is claimed on Japanese Patent Application No. 2012-246227, filed Nov. 8, 2012, the entire content of which are hereby incorporated by reference.

BACKGROUND OF THE INVENTION

Field of the Invention

The present invention relates to a technology for wirelessly transmitting data in a multicast manner.

Description of the Related Art

Conventionally, when a video receiving terminal selects and displays videos transmitted from a plurality of video transmission terminals, a video signal switching terminal (a switcher) is arranged between the video receiving terminal and the video transmission terminals, the video receiving terminal and the video signal switching terminal are connected to each other using a cable, the video signal switching terminal and the video transmission terminals are connected to each other using cables, and the video signal switching terminal is controlled, so that the selection of videos is performed. When the number of video receiving terminals and video transmission terminals used increases, there are problems that the wiring of cables and the configuration of the video signal switching terminal are complicated and it is not possible to quickly cope with a layout change in the video receiving terminals and the video transmission terminals.

In recent years, with the improvement of a wireless transmission technology, it is possible to wirelessly transmit videos from a video transmission terminal to a video receiving terminal. In this way, it is possible to cope with the aforementioned problems and realtime transmission from one video transmission terminal to a plurality of video receiving terminals has become possible.

As a scheme of efficiently transmitting data to a plurality of video receiving terminals, a multicast transmission scheme has been known. Since the conventional multicast transmission scheme is a scheme of one-sidedly transmitting data from a video transmission terminal to video receiving terminals without performing reception confirmation, it is a transmission scheme with low reliability and is largely affected by a communication error.

On the other hand, a transmission scheme in which reliability is improved by performing reception confirmation also in the multicast transmission has been proposed. According to this scheme, when no reception is confirmed through the reception confirmation, video data is retransmitted, so that it is possible to improve the reliability of communication.

FIG. 26 illustrates an aspect in which video data is transmitted from a video transmission terminal to n (n>1) video receiving terminals (illustrated as video receiving terminals 1 to n in FIG. 26). The right direction of FIG. 26 is a direction in which time passes. The video data transmitted from the video transmission terminal is divided into a plurality of pieces of video data, and each divided piece of video data is wirelessly transmitted within the time of one frame in a time division scheme and in a multicast manner. Video receiving terminals having received the video data transmit reception responses (ACK) to the video transmission terminal in response transmission periods (S1, S2, ..., and Sn), which have been assigned to the respective video receiving terminals, in a reception response period. The video transmission terminal receives the reception responses from the video receiving terminals and performs reception confirmation.

In a multicast transmission scheme with reception confirmation, the transmission reliability of video data is improved as compared with a multicast transmission scheme with no reception confirmation, but it takes a time to confirm the reception responses from the plurality of video receiving terminals, resulting in the reduction of transmission efficiency. In the reception response period in which the transmission and reception of the reception responses are performed, since the transmission and reception of the reception responses are performed in periods differing in the video receiving terminals, the length of the reception response period is a length corresponding to the number of the video receiving terminals. Particularly, in the case of performing video transmission in realtime, since trade-off occurs between video quality and the number of connectable terminals by an assignment ratio of a video data transmission time and a reception response period within the time of one frame, there is a problem that if video quality is to be maintained, the number of the connectable terminals is limited.

In order to avoid the aforementioned problem, Japanese Unexamined Patent Application No. 2008-17306 proposes a scheme of transmitting a packet for inquiring of an arbitrary receiving terminal about whether a transmission terminal can correctly receive multicast data.

SUMMARY

According to the first aspect of the present invention, a wireless transmission terminal, which wirelessly transmits data in a multicast manner to wireless receiving terminals that set whether to wirelessly transmit responses for wirelessly received data, wirelessly transmit priority information representing a priority of a reception side terminal, and serve as any one of response-enabled terminals for which wireless transmission of the responses is enabled and response-disabled terminals for which wireless transmission of the responses is disabled, includes: a wireless communication unit; a storage unit that stores an upper limit number of the response-enabled terminals; and a control unit that stores the priority information in the storage unit in correlation with identification information for identifying the wireless receiving terminal having wirelessly transmitted a connection request for receiving data wirelessly transmitted in a multicast manner when the connection request and the priority information have been wirelessly received in the wireless communication unit the connection request and the priority information being transmitted from the wireless receiving terminals, stores information representing that the wireless receiving terminal having wirelessly transmitted the connection request is the response-enabled terminal in the storage unit in correlation with the identification information, and allows response-enabled notification information for notifying that the wireless receiving terminal is the response-enabled terminal to be wirelessly transmitted from the wireless communication unit to the wireless receiving terminal when a number of the response-enabled terminals does not reach the upper limit number at a time point at which the connection request is wirelessly received in the wireless communication unit, selects a wireless receiving terminal with a priority lower than priorities of other wireless receiving terminals from among the wireless receiving terminals stored in the storage unit as the response-enabled terminals and the wireless receiving terminal having transmitted the connection request based on the priority information stored in the storage unit, stores information representing that the selected wireless receiving terminal is the response-disabled terminal in the storage unit in correlation with the identification information, and allows response-disabled notification information for notifying that the selected wireless receiving terminal is the response-disabled terminal to be wirelessly transmitted from the wireless communication unit to the selected wireless receiving terminal when the number of the response-enabled terminals reaches the upper limit number at the time point at which the connection request is wirelessly received in the wireless communication unit, and allows data to be wirelessly transmitted in a multicast manner from the wireless communication unit to the wireless receiving terminals stored in the storage unit as the response-enabled terminals and the wireless receiving terminals stored in the storage unit as the response-disabled terminals.

According to the second aspect of the present invention, a wireless receiving terminal, which wirelessly receives data wirelessly transmitted in a multicast manner from a wireless transmission terminal that wirelessly transmits data in a multicast manner, wirelessly receives priority information representing a priority of a reception side terminal, and sets a response-enabled terminal for which wireless transmission of a response for wirelessly received data is enabled and a response-disabled terminal for which wireless transmission of a response for wirelessly received data is disabled, includes: a storage unit that stores the priority information; a wireless communication unit that wirelessly transmits a connection request for receiving data and the priority information stored in the storage unit to the wireless transmission terminal, and wirelessly receives data wirelessly transmitted from the wireless transmission terminal in a multicast manner and a control unit that allows a response to be wirelessly transmitted from the wireless communication unit when data from the wireless transmission terminal has been wirelessly received in the wireless communication unit in a case in which response-enabled notification information for notifying of the response-enabled terminal has been wirelessly received in the wireless communication unit, and prevents a response from being wirelessly transmitted from the wireless communication unit when data from the wireless transmission terminal has been wirelessly received in the wireless communication unit in a case in which response-disabled notification information for notifying of the response-disabled terminal has been wirelessly received in the wireless communication unit.

According to the third aspect of the present invention, a wireless communication system, which includes a wireless transmission terminal that wirelessly transmits data in a multicast manner and wireless receiving terminals that wirelessly receive data wirelessly transmitted from the wireless transmission terminal in a multicast manner, set whether to wirelessly transmit responses for wirelessly received data, wirelessly transmit priority information representing a priority of a reception side terminal, and serve as any one of response-enabled terminals for which wireless transmission of the responses is enabled and response-disabled terminals for which wireless transmission of the responses is disabled, wherein the wireless transmission terminal includes: a first wireless communication unit a first storage unit that stores an upper limit number of the response-enabled terminals; and a first control unit that stores the priority information in the first storage unit in correlation with identification information for identifying the wireless receiving terminal having wirelessly transmitted a connection request for receiving data wirelessly transmitted in a multicast manner when the connection request and the priority information have been wirelessly received in the first wireless communication unit, the connection request and the priority information being transmitted from the wireless receiving terminals, stores information representing that the wireless receiving terminal having wirelessly transmitted the connection request is the response-enabled terminal in the first storage unit in correlation with the identification information, and allows response-enabled notification information for notifying that the wireless receiving terminal is the response-enabled terminal to be wirelessly transmitted from the first wireless communication unit to the wireless receiving terminal when a number of the response-enabled terminals does not reach the upper limit number at a time point at which the connection request is wirelessly received in the first wireless communication unit, selects a wireless receiving terminal with a priority lower than priorities of other wireless receiving terminals from among the wireless receiving terminals stored in the first storage unit as the response-enabled terminals and the wireless receiving terminal having transmitted the connection request based on the priority information stored in the first storage unit, stores information representing that the selected wireless receiving terminal is the response-disabled terminal in the first storage unit in correlation with the identification information, and allows response-disabled notification information for notifying that the selected wireless receiving terminal is the response-disabled terminal to be wirelessly transmitted from the first wireless communication unit to the selected wireless receiving terminal when the number of the response-enabled terminals reaches the upper limit number at the time point at which the connection request is wirelessly received in the first wireless communication unit, and allows data to be wirelessly transmitted in a multicast manner from the first wireless communication unit to the wireless receiving terminals stored in the first storage unit as the response-enabled terminals and the wireless receiving terminals stored in the first storage unit as the response-disabled terminals, and the wireless receiving terminal includes: a second storage unit that stores the priority information; a second wireless communication unit that wirelessly transmits a connection request and the priority information stored in the second storage unit to the wireless transmission terminal, and wirelessly receives data wirelessly transmitted from the wireless transmission terminal in a multicast manner; and a second control unit that allows a response to be wirelessly transmitted from the second wireless communication unit when data from the wireless transmission terminal has been wirelessly received in the second wireless communication unit in a case in which response-enabled notification information for notifying of the response-enabled terminal has been wirelessly received in the second wireless communication unit, and prevents a response from being wirelessly transmitted from the second wireless communication unit when data from the wireless transmission terminal has been wirelessly received in the second wireless communication unit in a case in which response-disabled notification information for notifying of the response-disabled terminal has been wirelessly received in the second wireless communication unit.

According to the fourth aspect of the present invention, a wireless communication method includes: a step in which a wireless transmission terminal, which includes a wireless communication unit for wirelessly transmitting data in a multicast manner to wireless receiving terminals that set whether to wirelessly transmit responses for wirelessly received data, wirelessly transmit priority information representing a priority of a reception side terminal, and serve as any one of response-enabled terminals for which wireless transmission of the responses is enabled and response-disabled terminals for which wireless transmission of the responses is disabled and a storage unit for storing an upper limit number of the response-enabled terminals, stores the priority information in the storage unit in correlation with identification information for identifying the wireless receiving terminal having wirelessly transmitted a connection request for receiving data wirelessly transmitted in a multicast manner when the connection request and the priority information have been wirelessly received in the wireless communication unit, the connection request and the priority information being transmitted from the wireless receiving terminals; a step in which the wireless transmission terminal stores information representing that the wireless receiving terminal having wirelessly transmitted the connection request is the response-enabled terminal in the storage unit in correlation with the identification information, and allows response-enabled notification information for notifying that the wireless receiving terminal is the response-enabled terminal to be wirelessly transmitted from the wireless communication unit to the wireless receiving terminal when a number of the response-enabled terminals does not reach the upper limit number at a time point at which the connection request is wirelessly received in the wireless communication unit; a step in which the wireless transmission terminal selects a wireless receiving terminal with a priority lower than priorities of other wireless receiving terminals from among the wireless receiving terminals stored in the storage unit as the response-enabled terminals and the wireless receiving terminal having transmitted the connection request based on the priority information stored in the storage unit, stores information representing that the selected wireless receiving terminal is the response-disabled terminal in the storage unit in correlation with the identification information, and allows response-disabled notification information for notifying that the selected wireless receiving terminal is the response-disabled terminal to be wirelessly transmitted from the wireless communication unit to the selected wireless receiving terminal when the number of the response-enabled terminals reaches the upper limit number at the time point at which the connection request is wirelessly received in the wireless communication unit; and a step in which the wireless transmission terminal allows data to be wirelessly transmitted in a multicast manner from the wireless communication unit to the wireless receiving terminals stored in the storage unit as the response-enabled terminals and the wireless receiving terminals stored in the storage unit as the response-disabled terminals.

According to the fifth aspect of the present invention, a wireless communication method includes: a step in which a wireless receiving terminal, which includes a wireless communication unit for wirelessly receiving data wirelessly transmitted in a multicast manner from a wireless transmission terminal that wirelessly transmits data in a multicast manner, wirelessly receives priority information representing a priority of a reception side terminal, and sets a response-enabled terminal for which wireless transmission of a response for wirelessly received data is enabled and a response-disabled terminal for which wireless transmission of a response for wirelessly received data is disabled and a storage unit that stores the priority information, wirelessly transmits a connection request for receiving data and the priority information stored in the storage unit to the wireless transmission terminal; a step in which the wireless receiving terminal allows a response to be wirelessly transmitted from the wireless communication unit when data from the wireless transmission terminal has been wirelessly received in the wireless communication unit in a case in which response-enabled notification information for notifying of the response-enabled terminal has been wirelessly received in the wireless communication unit; and a step in which the wireless receiving terminal prevents a response from being wirelessly transmitted from the wireless communication unit when data from the wireless transmission terminal has been wirelessly received in the wireless communication unit in a case in which response-disabled notification information for notifying of the response-disabled terminal has been wirelessly received in the wireless communication unit.

According to the sixth aspect of the present invention, a computer readable storage device saving a computer program for causing a computer of a wireless transmission terminal, which includes a wireless communication unit for wirelessly transmitting data in a multicast manner to wireless receiving terminals that set whether to wirelessly transmit responses for wirelessly received data, wirelessly transmit priority information representing a priority of a reception side terminal, and serve as any one of response-enabled terminals for which wireless transmission of the responses is enabled and response-disabled terminals for which wireless transmission of the responses is disabled and a storage unit for storing an upper limit number of the response-enabled terminals, to perform: a step of storing the priority information in the storage unit in correlation with identification information for identifying the wireless receiving terminal having wirelessly transmitted a connection request for receiving data wirelessly transmitted in a multicast manner when the connection request and the priority information have been wirelessly received in the wireless communication unit, the connection request and the priority information being transmitted from the wireless receiving terminals; a step of storing information representing that the wireless receiving terminal having wirelessly transmitted the connection request is the response-enabled terminal in the storage unit in correlation with the identification information, and allowing response-enabled notification information for notifying that the wireless receiving terminal is the response-enabled terminal to be wirelessly transmitted from the wireless communication unit to the wireless receiving terminal when a number of the response-enabled terminals does not reach the upper limit number at a time point at which the connection request is wirelessly received in the wireless communication unit; a step of selecting a wireless receiving terminal with a priority lower than priorities of other wireless receiving terminals from among the wireless receiving terminals stored in the storage unit as the response-enabled terminals and the wireless receiving terminal having transmitted the connection request based on the priority information stored in the storage unit storing information representing that the selected wireless receiving terminal is the response-disabled terminal in the storage unit in correlation with the identification information, and allowing response-disabled notification information for notifying that the selected wireless receiving terminal is the response-disabled terminal to be wirelessly transmitted from the wireless communication unit to the selected wireless receiving terminal when the number of the response-enabled terminals reaches the upper limit number at the time point at which the connection request is wirelessly received in the wireless communication unit; and a step of allowing data to be wirelessly transmitted in a multicast manner from the wireless communication unit to the wireless receiving terminals stored in the storage unit as the response-enabled terminals and the wireless receiving terminals stored in the storage unit as the response-disabled terminals.

According to the seventh aspect of the present invention, a computer readable storage device saving a computer program for causing a computer of a wireless receiving terminal, which includes a wireless communication unit for wirelessly receiving data wirelessly transmitted in a multicast manner from a wireless transmission terminal that wirelessly transmits data in a multicast manner, wirelessly receives priority information representing a priority of a reception side terminal, and sets a response-enabled terminal for which wireless transmission of a response for wirelessly received data is enabled and a response-disabled terminal for which wireless transmission of a response for wirelessly received data is disabled and a storage unit for storing the priority information, to perform: a step of wirelessly transmitting a connection request for receiving data and the priority information stored in the storage unit to the wireless transmission terminal; a step of allowing a response to be wirelessly transmitted from the wireless communication unit when data from the wireless transmission terminal has been wirelessly received in the wireless communication unit in a case in which response-enabled notification information for notifying of the response-enabled terminal has been wirelessly received in the wireless communication unit; and a step of preventing a response from being wirelessly transmitted from the wireless communication unit when data from the wireless transmission terminal has been wirelessly received in the wireless communication unit in a case in which response-disabled notification information for notifying of the response-disabled terminal has been wirelessly received in the wireless communication unit.

BRIEF DESCRIPTION OF THE DRAWINGS

FIG. 7 is a reference diagram illustrating a connection management table in one embodiment of the present invention.

FIG. 8 is a reference diagram illustrating a reception response management table in one embodiment of the present invention.

FIG. 13 is a reference diagram illustrating a connection management table in one embodiment of the present invention.

FIG. 14 is a reference diagram illustrating a reception response management table in one embodiment of the present invention.

FIG. 15 is a reference diagram illustrating a connection management table in one embodiment of the present invention.

FIG. 16 is a reference diagram illustrating a reception response management table in one embodiment of the present invention.

FIG. 18 is a reference diagram illustrating a connection management table in one embodiment of the present invention.

FIG. 20 is a reference diagram illustrating a connection management table in one embodiment of the present invention.

FIG. 21 is a reference diagram illustrating a connection management table in one embodiment of the present invention.

FIG. 22 is a reference diagram illustrating a reception response management table in one embodiment of the present invention.

FIG. 23 is a reference diagram illustrating a connection management table in one embodiment of the present invention.

FIG. 24 is a reference diagram illustrating a reception response management table in one embodiment of the present invention.

DETAILED DESCRIPTION OF THE PREFERRED EMBODIMENTS

Figure 1:
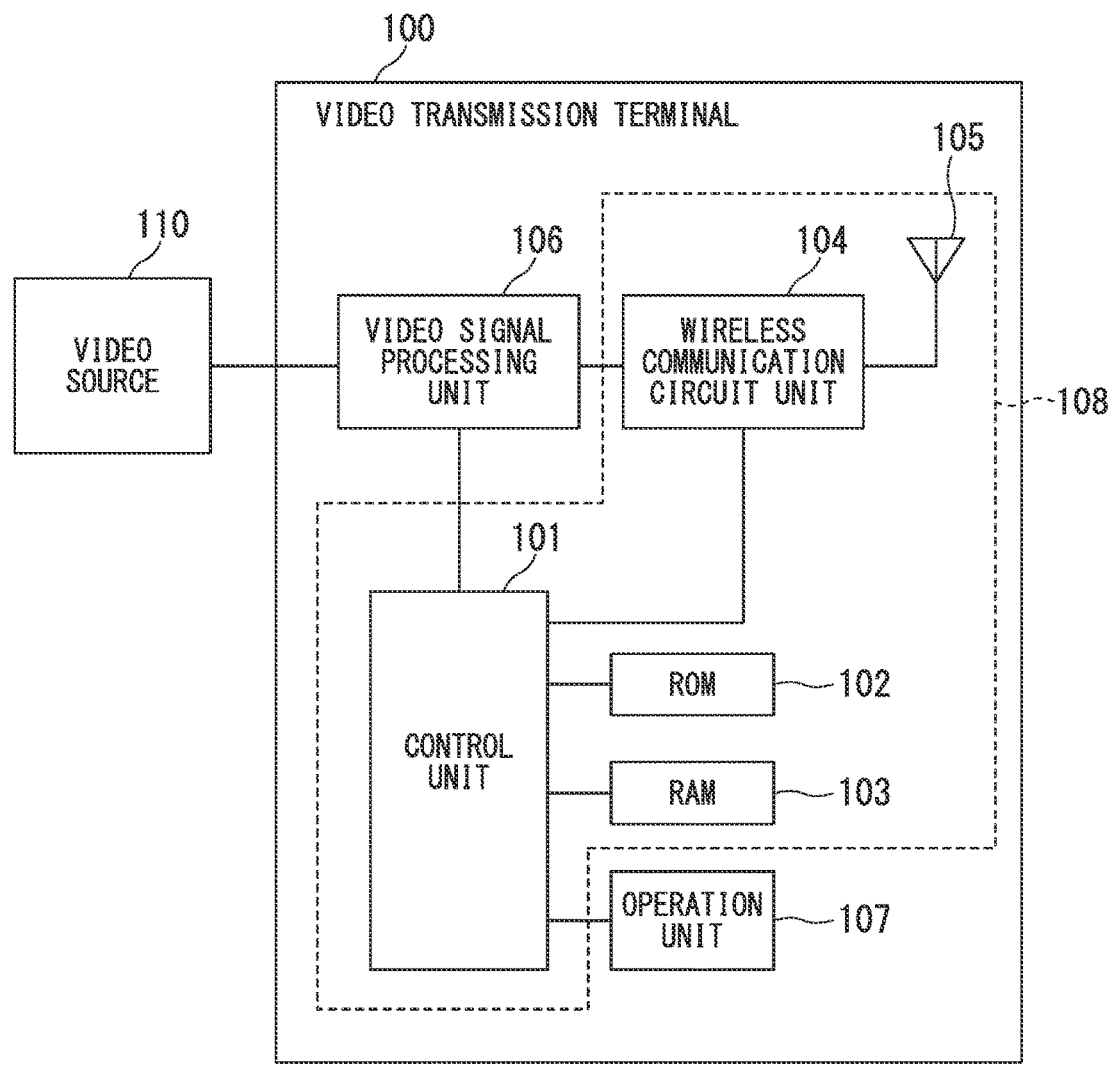
FIG. 1 is a block diagram illustrating a configuration of a video transmission terminal according to one embodiment of the present invention.

Hereinafter, one embodiment of the present invention will be described with reference to the accompanying drawings. FIG. 1 illustrates an electrical configuration of a video transmission terminal according to the present embodiment. A video transmission terminal 100 illustrated in FIG. 1 includes a control unit 101, a ROM 102, a RAM 103, a wireless communication circuit unit 104, an antenna 105, a video signal processing unit 106, and an operation unit 107, and they are connected to one another as illustrated in FIG. 1. Furthermore, a video source 110 is connected to the video transmission terminal 100.

The control unit 101 operates according to a program stored in the ROM 102 and controls operation sequences of the video transmission terminal 100. The ROM 102 is a nonvolatile memory such as a flash ROM, and program data for the control of the video transmission terminal 100 and various types of setting information including communication setting parameters are stored in the ROM 102.

The RAM 103 is used as a work area that is used for arithmetic calculation and the like of the control unit 101, and an area for temporarily storing various types of settings and the like. The wireless communication circuit unit 104 and the antenna 105 are a configuration for wirelessly transmitting video data to a video receiving terminal in a multicast manner, and wirelessly communicating various types of information with the video receiving terminal. The wireless communication circuit unit 104 includes a high frequency circuit section, a coding/decoding circuit section, a buffer memory and the like required for wireless communication, and the antenna 105 is connected to the wireless communication circuit unit 104. In the present embodiment, as one example of a wireless communication scheme, a wireless scheme such as a wireless LAN (IEEE 802.11) is used.

The video signal processing unit 106 performs compression processing on video data supplied from the video source 110 using a predetermined scheme, and then stores the compressed video data in a buffer of the RAM 103. At the time point at which video data compression processing corresponding to one frame is completed, the video signal processing unit 106 generates a video data Ready interrupt for notifying the control unit 101 that video data is ready.

The operation unit 107 has a plurality of switches including a power switch, an operation switch, a setting switch and the like, and outputs the states and the state changes of these switches to the control unit 101 as electrical signals. Furthermore, in the operation unit 107, a plurality of LEDs for broadcasting a connection state and a communication state with the video receiving terminal are arranged.

The video source 110 is a device for supplying video data such as a video camera and a DVD player, and is connected to the video signal processing unit 106 via an HDMI (a registered trademark) or DVI video interface. In FIG. 1, the video source 110 is arranged in a housing separate from a housing in which the control unit 101 and the like are arranged and is connected to the video signal processing unit 106; however, it may be possible to employ a configuration in which the video source 110 may be arranged in the housing in which the control unit 101 and the like are arranged and may be connected to the video signal processing unit 106.

The functions of the video transmission terminal 100 are realized when the control unit 101, which is a computer (CPU) of the video transmission terminal 100, reads and executes the program stored in the ROM 102, which is a "computer-readable recording medium." Furthermore, the aforementioned program may be transmitted on a computer that has stored the program in a storage device and the like to a content transmission terminal via a transmission medium or transmission waves of the transmission medium, and may be input to the video transmission terminal 100. In this case, the "transmission medium" for transmitting the program indicates a medium having an information transmission function such as a network (a communication network) such as the Internet and a communication line such as a telephone line. Furthermore, the aforementioned program may be a program for realizing some of the aforementioned functions. Moreover, the aforementioned program may also be a program capable of realizing the aforementioned functions in combination with a program previously recorded in the computer, that is, a difference file (a difference program).

The control unit 101, the ROM 102, the RAM 103, the wireless communication circuit unit 104, and the antenna 105 constitute a wireless transmission terminal 108. The wireless transmission terminal 108 corresponds to a wireless transmission terminal, which is the basic concept of the present invention. For example, the control unit 101 corresponds to a control unit in the wireless transmission terminal of the present invention, the ROM 102 and the RAM 103 correspond to a storage unit in the wireless transmission terminal of the present invention, and the wireless communication circuit unit 104 and the antenna 105 correspond to a wireless communication unit in the wireless transmission terminal of the present invention.

Figure 2:
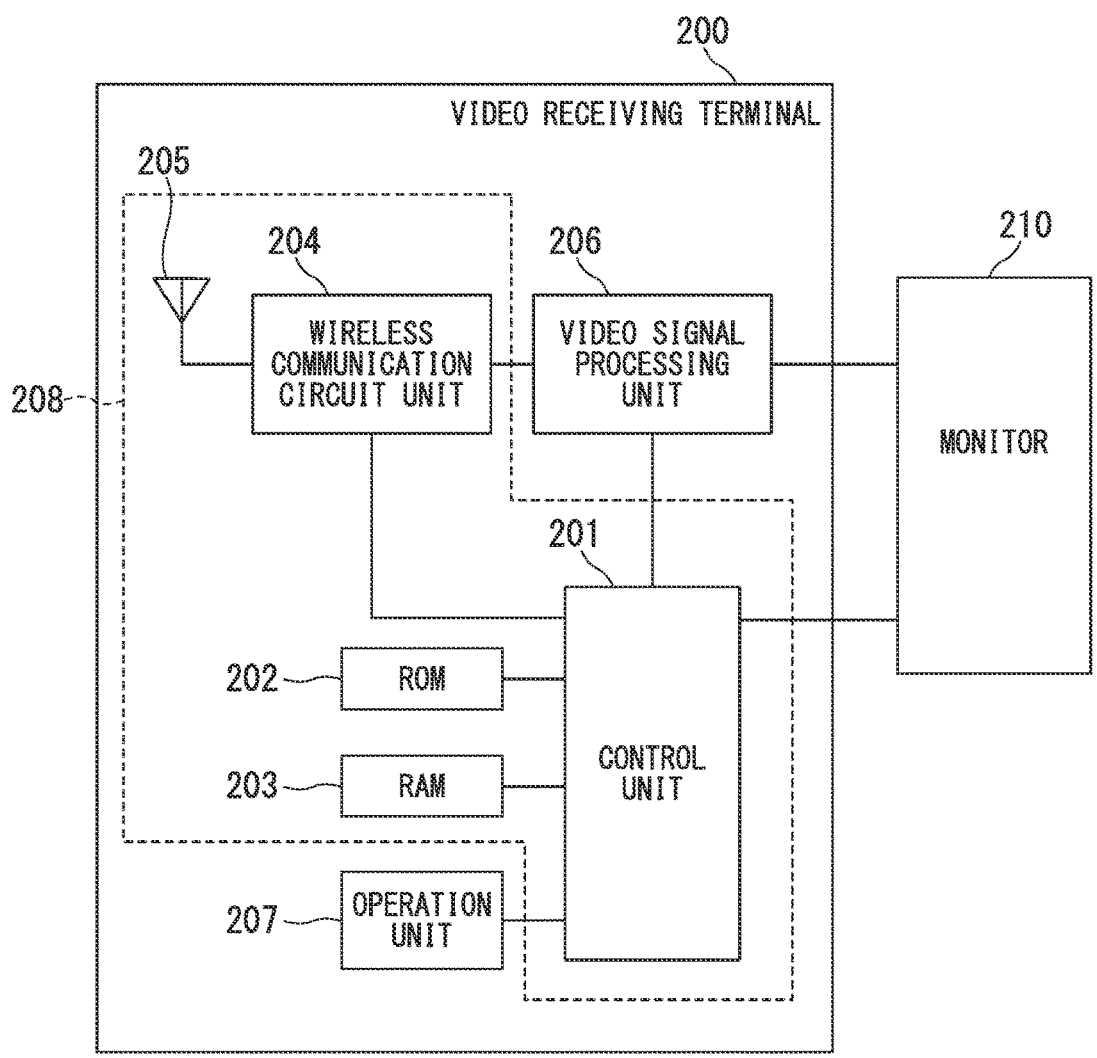
FIG. 2 is a block diagram illustrating a configuration of a video receiving terminal according to one embodiment of the present invention.
Figure 3:
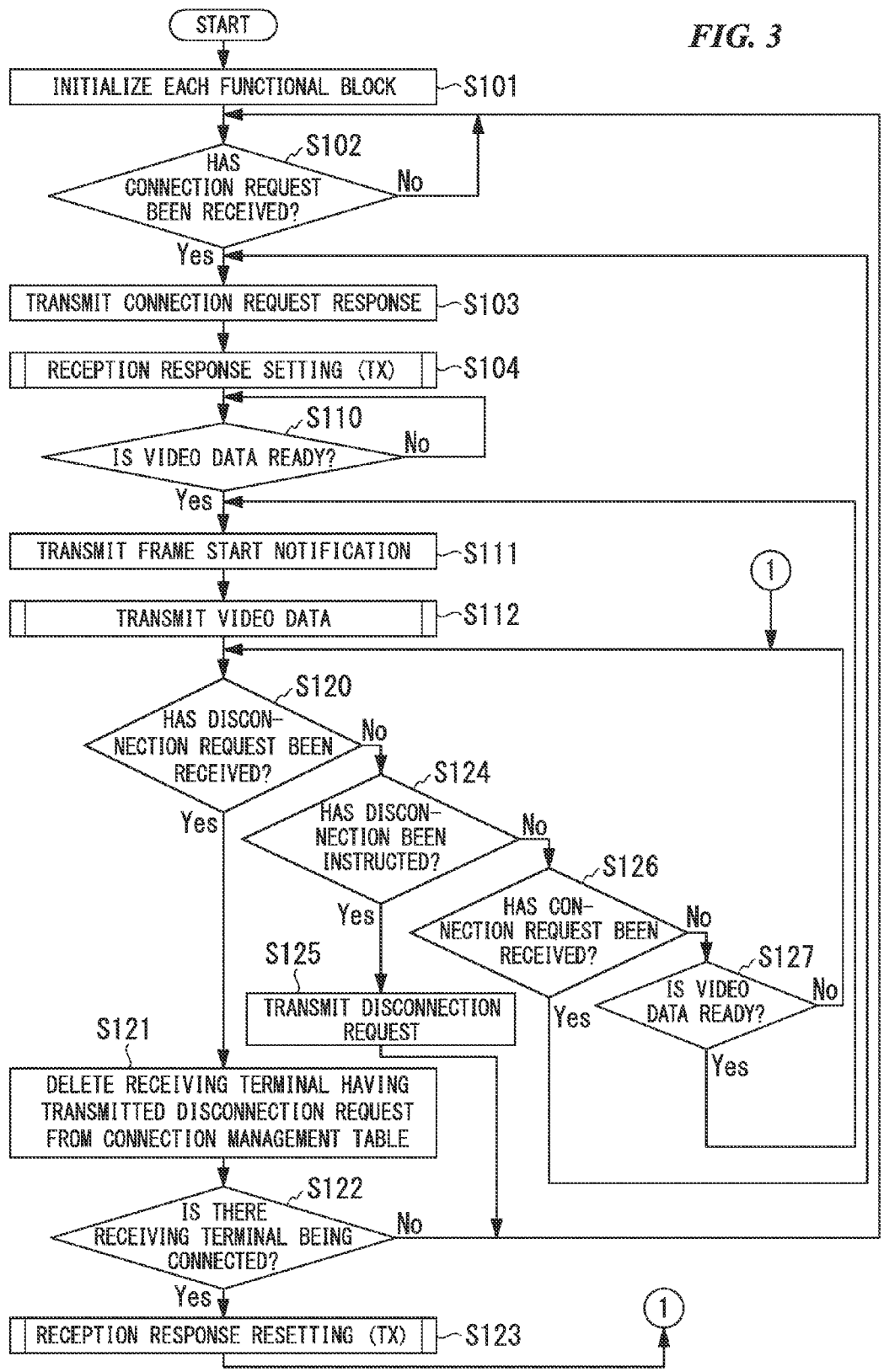
FIG. 3 is a flowchart illustrating a procedure of an operation of a video transmission terminal according to one embodiment of the present invention.

FIG. 2 illustrates an electrical configuration of a video receiving terminal according to the present embodiment. A video receiving terminal 200 illustrated in FIG. 2 includes a control unit 201, a ROM 202, a RAM 203, a wireless communication circuit unit 204, an antenna 205, a video signal processing unit 206, and an operation unit 207, and they are connected to one another as illustrated in FIG. 2. Furthermore, a monitor 210 is connected to the video receiving terminal 200.

The control unit 201 operates according to a program stored in the ROM 202 and controls operation sequences of the video receiving terminal 200. The ROM 202 is a nonvolatile memory such as a flash ROM, and program data for the control of the video receiving terminal 200 and various types of setting information including communication setting parameters are stored in the ROM 202.

The RAM 203 is used as a work area that is used for arithmetic calculation and the like of the control unit 201, and an area for temporarily storing various types of setting and the like. The wireless communication circuit unit 204 and the antenna 203 are a configuration for wirelessly receiving video data wirelessly transmitted from a video transmission terminal in a multicast manner, and wirelessly communicating various types of information with the video transmission terminal 100. The wireless communication circuit unit 204 includes a high frequency circuit section, a coding/decoding circuit section a buffer memory and the like required for wireless communication, and is connected to the antenna 205. In the present embodiment, as one example of a wireless communication scheme, a wireless scheme such as a wireless LAN (IEEE 802.11) is used.

The video signal processing unit 206 extends compressed video data received in the wireless communication circuit unit 204, converts the extended data into a video signal of HDMI (a registered trademark), NTSC and the like, and outputs the video signal to the monitor 210. The operation unit 207 has a plurality of switches including a power switch, an operation switch, a setting switch and the like, and outputs the states and the state changes of these switches to the control unit 201 as electrical signals. When a video transmission terminal serving as a connection partner of the video receiving terminal 200 is switched, the operation unit 207 operates as an input means by which an operator selects the video transmission terminal serving as a connection partner from a list of video transmission terminals displayed on the monitor 210 and inputs an instruction.

The monitor 210 includes a liquid crystal display device and a control circuit thereof, displays videos based on the video data from the video transmission terminal 100, and operates as a display means for broadcasting the state of a wireless connection. Furthermore, when a video transmission terminal serving as a connection partner of the video receiving terminal 200 is switched, the monitor 210 operates as a display means for displaying a list of selectable video transmission terminals.

The functions of the video receiving terminal 200 are realized when the control unit 201, which is a computer (CPU) of the video receiving terminal 200, reads and executes the program stored in the ROM 202, which is a "computer-readable recording medium." Furthermore, the aforementioned program may be transmitted from a computer that has stored the program in a storage device and the like to a content transmission terminal via a transmission medium or transmission waves of the transmission medium, and may be input to the video receiving terminal 200. In this case, the "transmission medium" for transmitting the program indicates a medium having an information transmission function such as a network (a communication network) such as the Internet and a communication line such as a telephone line. Furthermore, the aforementioned program may be a program for realizing some of the aforementioned functions. Moreover, the aforementioned program may also be a program capable of realizing the aforementioned functions in combination with a program previously recorded in the computer, that is, a difference file (a difference program).

The control unit 201, the ROM 202, the RAM 203, the wireless communication circuit unit 204, and the antenna 205 constitute a wireless receiving terminal 208. The wireless receiving terminal 208 corresponds to a wireless receiving terminal, which is the basic concept of the present invention. For example, the control unit 201 corresponds to a control unit in the wireless receiving terminal of the present invention, the ROM 202 and the RAM 203 correspond to a storage unit in the wireless receiving terminal of the present invention, and the wireless communication circuit unit 204 and the antenna 205 correspond to a wireless communication unit in the wireless receiving terminal of the present invention.

Next, an operation of the video transmission terminal 100 will be described. FIG. 3 to FIG. 6 illustrate the operation of the video transmission terminal 100. When the video transmission terminal 100 is powered on, the control unit 101 initializes each functional block of the video transmission terminal 100 (step S101).

Subsequently, the control unit 101 enters a state of waiting for the reception of a connection request transmitted from the video receiving terminal 200 (step S102). The connection request is a packet for requesting a connection with respect to a connection partner of wireless communication in order to receive data. The connection request includes a MAC address and priority level information (priority information) of the video receiving terminal 200. As one example, when the video transmission terminal 100 and the video receiving terminal 200 are medical devices and are installed in an operating room, the priority level of the video receiving terminal 200 is decided based on whether the generation of video distortion has an influence on work. For example, when the video receiving terminal 200 is any one of a monitor for a surgical operator, a monitor for a surgical staff, and a monitor for observation, the priority levels are assigned in increasing order to the monitor for a surgical operator, the monitor for a surgical staff, and the monitor for observation. In the present embodiment, the connection request includes the information of the priority level; however, the information of the priority level may be transmitted by a packet separate from the connection request.

When the connection request is not received, the control unit 101 continues the process of waiting for the reception of the connection request in step S102. Furthermore, when the wireless communication circuit unit 104 has received the connection request via the antenna 105, the control unit 101 is notified of the content of the connection request. The control unit 101 controls the wireless communication circuit unit 104 to transmit a connection request response to the video receiving terminal 200 as a response to the connection request (step S103). In this way, a connection with the video receiving terminal 200 is established.

Figure 4:
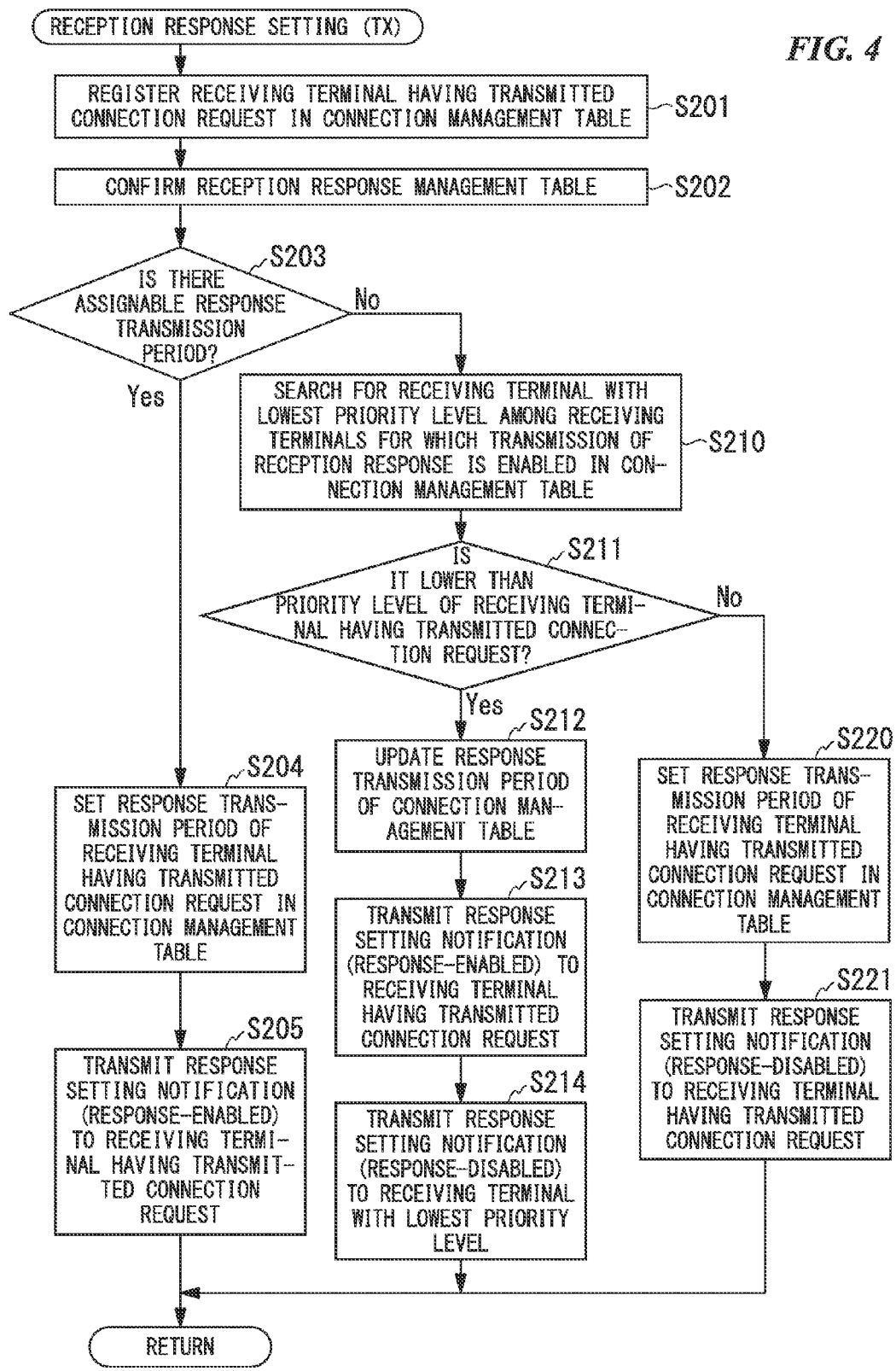
FIG. 4 is a flowchart illustrating a procedure of an operation of a video transmission terminal according to one embodiment of the present invention.

Subsequently, the control unit 101 performs reception response setting to be described below (step S104). FIG. 4 illustrates a detailed operation of the video transmission terminal 100 when performing the reception response setting in step S104. The control unit 101 registers the MAC address and the priority level information of the video receiving terminal 200, which are included in the connection request, in a connection management table (step S201).

The connection management table is a table for managing connection states of the video transmission terminal 100 and the video receiving terminal 200, and is stored in the RAM 103. FIG. 7 illustrates one example of the connection management table. Information managed in the connection management table includes a receiver No., a MAC address, a priority level, a response transmission period, and a response reception state.

The receiver No. is a convenient number for identifying information of each video receiving terminal 200 managed in the connection management table. It is sufficient if a maximum value (N of FIG. 7) of the receiver No. is equal to or more than 2, but it is preferable that the maximum value be a sufficiently large value within the limitation of the capacity of the RAM 103. The MAC address is identification information for uniquely identifying the video receiving terminal 200 and is included in the connection request from the video receiving terminal 200. The priority level indicates the priority of the video receiving terminal 200 and is included in the connection request from the video receiving terminal 200. In the present embodiment, as one example, the values of the priority level are three types of 1 to 3 and the priority levels in increasing order are 1, 2, and 3.

Figure 26:
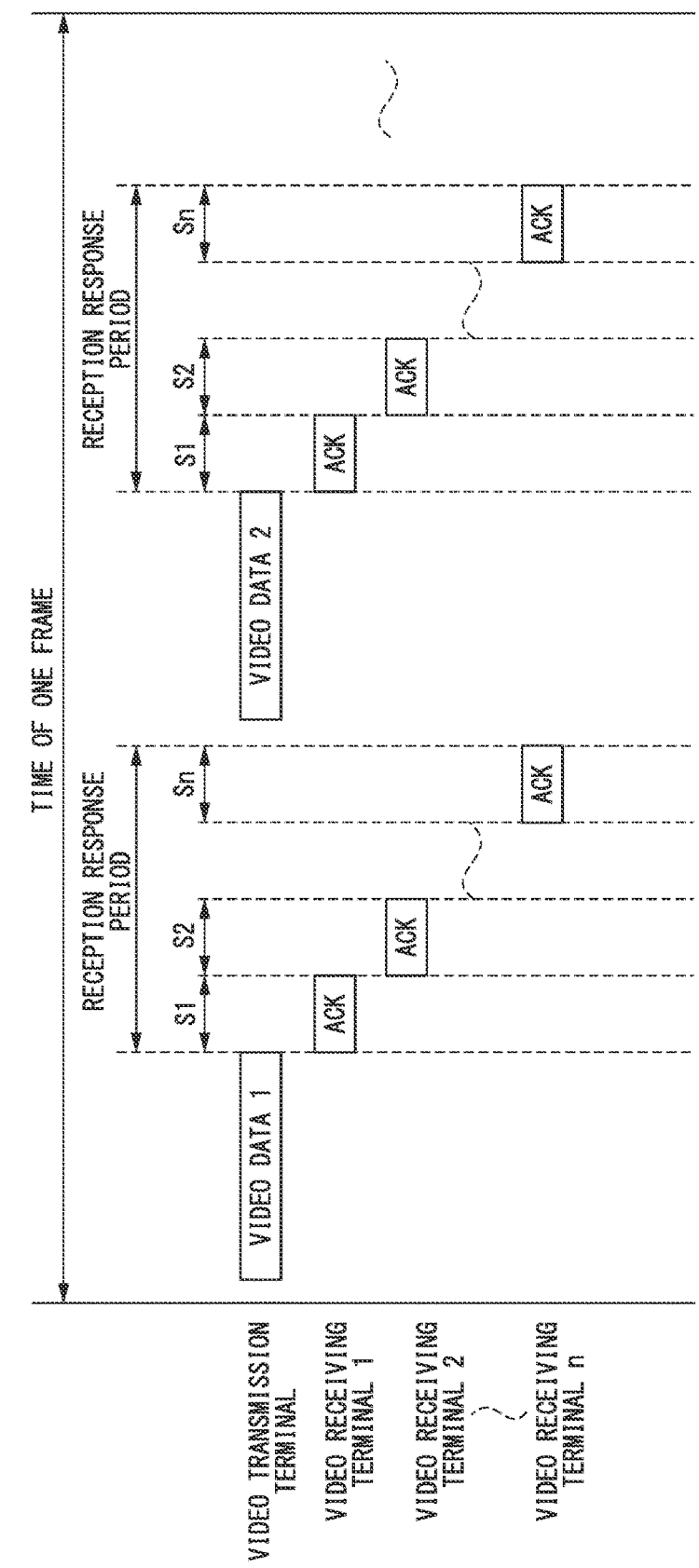
FIG. 26 is a timing chart illustrating an aspect of conventional video data transmission.

The response transmission period is a period (corresponding to periods S1, S2, . . . , and Sn of FIG. 26) assigned to each video receiving terminal 200 in a time division scheme in a reception response period provided in order for the video receiving terminal 200 to transmit a reception response after wireless transmission of video data is performed. Each video receiving terminal 200 transmits a reception response in a response transmission period assigned thereto. The values of the response transmission period in the connection management table are 0 to 5, and the reception response period includes five response transmission periods. The number of the response transmission periods constituting the reception response period may not be 5.

In the connection management table, when the MAC address and the priority level have been set and the value of the response transmission period has further been set as a value other than 0, wireless transmission of a reception response from a corresponding video receiving terminal 200 is enabled. Furthermore, in the connection management table, even though the MAC address and the priority level have been set, when the value of the response transmission period has been set to 0, wireless transmission of a reception response from a corresponding video receiving terminal 200 is disabled. That is, a video receiving terminal 200 that has a response transmission period with a value other than 0 in the connection management table is a response-enabled terminal for which wireless transmission of a reception response is enabled, and a video receiving terminal 200 that has a response transmission period with a value of 0 in the connection management table is a response-disabled terminal for which wireless transmission of a reception response is disabled. Consequently, it is possible to identify whether a video receiving terminal 200 is any one of the response-enabled terminal ad the response-disabled terminal from the value of the response transmission period in the connection management table.

The response reception state is information representing the presence or absence of a reception response from a video receiving terminal 200. When the value of the response reception state has been set to 1, it represents that the reception response from the video receiving terminal 200 has been received, and when the value of the response reception state has been set to 0, it represents that the reception response from the video receiving terminal 200 has not been received. Whenever video data is transmitted, the value of the response reception state corresponding to a video receiving terminal 200 being connected is set to 0, and when a reception response has been received, the value of the response reception state corresponding to a video receiving terminal 200 having transmitted the response reception is set to 1.

Detailed information of the response transmission period assigned to each video receiving terminal 200 is managed by a reception response management table. The reception response management table is stored in the RAM 103. FIG. 8 illustrates one example of the reception response management table. Information managed in the reception response management table includes a Slot_No, a response delay time, and a use state.

The Slot_No is identification information for identifying respective response transmission periods. In the present embodiment, as one example, the values of the Slot_No are five types of 1 to 5. The values of the Slot_No coincide with the values of the response transmission period in the connection management table. Since a maximum value of the Slot_No is 5, the response transmission period is assigned to maximum of five video receiving terminals 200. That is, the maximum number of response-enabled terminals for which transmission of a reception response is enabled is 5. The maximum number of video receiving terminals 200 to which the response transmission period is assigned (response-enabled terminals) may not be 5.

The response delay time is a waiting time until each video receiving terminal 200 receives video data and then transmits a reception response. In more detail, the response delay time is a time until each video receiving terminal 200 transmits the reception response (until the response transmission period assigned to each video receiving terminal 200 is started) from a reference timing (a start timing of the reception response period) after the wireless transmission of video data has been completed. In the present embodiment, as one example, the response delay time is set from 50 μs to 250 μs at intervals of 50 μs. The response delay times of respective video receiving terminals 200 are different from one another in order to prevent reception responses from the respective video receiving terminals 200 from colliding with one another.

The use state is a use situation of the response transmission period. When the value of the use state is set to 1, it represents that the response transmission period has been assigned to a video receiving terminal 200, and when the value of the use state is set to 0, it represents that the response transmission period has not been assigned to a video receiving terminal 200, and the response transmission period can be assigned to a video receiving terminal 200 newly attempting a connection.

For example, when the initialization is performed in step S101, the connection management table and the reception response management table are generated based on information (including an upper limit and the like of the number of video receiving terminals 200 to which the response transmission period is assignable) of a format of each table held in the program stored in the ROM 202, and are stored in the RAM 103.

After the MAC address and the priority level information of the video receiving terminal 200 included in the connection request are registered in the connection management table in step S201, the control unit 101 confirms the reception response management table (step S202). Subsequently, the control unit 101 determines whether there is a response transmission period assignable to the video receiving terminal 200 (step S203).

In the reception response management table, when the value of the use state correlated with the Slot_No having any one of 1 to 5 is 0, a response transmission period corresponding to the Slot_No is assignable to the video receiving terminal 200. Furthermore, in the reception response management table, when the value of the use state correlated with the Slot_No having all of 1 to 5 is 1, there is no response transmission period assignable to the video receiving terminal 200.

When there is a response transmission period assignable to the video receiving terminal 200, the control unit 101 sets the value of the Slot_No of a response transmission period which is assignable to the video receiving terminal 200 in the reception response management table in the value of a response transmission period of a video receiving terminal 200 having transmitted the connection request in the connection management table (step S204). Furthermore, in step S204, the control unit 101 sets the value of the use state of the response transmission period assigned to the video receiving terminal 200 to 1 in the reception response management table.

Subsequently, the control unit 101 generates a response setting notification for notifying the video receiving terminal 200 of an assignment result of the response transmission period, and transmits the response setting notification to the video receiving terminal 200 having transmitted the connection request via the wireless communication circuit unit 104 and the antenna 105 (step S205). The response setting notification transmitted in step S205 includes a response delay time of the response transmission period assigned to the video receiving terminal 200. When the response delay time included in the response setting notification is not 0, the response setting notification serves as information (response-enabled notification information) for notifying the video receiving terminal 200 that the transmission of a reception response has been enabled. Information explicitly indicating that the transmission of the reception response has been enabled may be included in the response setting notification.

When there is no response transmission period assignable to the video receiving terminal 200 in step S203, the control unit 101 confirms the connection management table and searches for a video receiving terminal 200 with the lowest priority level among video receiving terminals 200 for which the transmission of the reception response is enabled (step S210). In step S210, in the connection management table, a video receiving terminal 200 with the largest priority level value is searched for among video receiving terminals 200 with a response transmission period value of 0. Subsequently, the control unit 101 determines whether the priority level of the video receiving terminal 200 found by the search in step S210 is lower than that of the video receiving terminal 200 having transmitted the connection request (step S211).

When the priority level of the video receiving terminal 200 found by the search in step S210 is lower than that of the video receiving terminal 200 having transmitted the connection request, it represents that there is a terminal with a priority level lower than that of the video receiving terminal 200 having transmitted the connection request among the video receiving terminals 200 registered in the connection management table. In this case, the control unit 101 changes the video receiving terminal 200 found by the search in step S210 to a response-disabled terminal, and updates the value of the response transmission period of the connection management table in order to set the video receiving terminal 200 having transmitted the connection request as a response-enabled terminal (step S212). In step S212, in the connection management table, the value of the response transmission period of the video receiving terminal 200 found by the search in step S210 is changed to 0, and the value of the response transmission period before the change is set as the value of the response transmission period of the video receiving terminal 200 having transmitted the connection request.

Subsequently, the control unit 101 generates a response setting notification and transmits the response setting notification to the video receiving terminal 200 having transmitted the connection request via the wireless communication circuit unit 104 and the antenna 105 (step S213). The response setting notification transmitted in step S213 includes the response delay time of the response transmission period assigned to the video receiving terminal 200 having transmitted the connection request, which is managed in the reception response management table.

Subsequently, the control unit 101 generates a response setting notification and transmits the response setting notification to the video receiving terminal 200 found by the search in step S210 via the wireless communication circuit unit 104 and the antenna 105 (step S214). The response setting notification transmitted in step S214 includes 0 as the response delay time. When the response delay time included in the response setting notification is 0, the response setting notification serves as information (response-disabled notification information) for notifying the video receiving terminal 200 that the transmission of a reception response has been disabled. Information explicitly indicating that the transmission of the reception response has been disabled may be included in the response setting notification.

In step S211, when the priority level of the video receiving terminal 200 found by the search in step S210 is higher than or equal to that of the video receiving terminal 200 having transmitted the connection request, the control unit 101 sets the value of the response transmission period of the video receiving terminal 200 having transmitted the connection request to 0 in the connection management table in order to set the video receiving terminal 200 having transmitted the connection request as a response-disabled terminal (step S220).

Subsequently, the control unit 101 generates a response setting notification and transmits the response setting notification to the video receiving terminal 200 having transmitted the connection request via the wireless communication circuit unit 104 and the antenna 105 (step S221). The response setting notification transmitted in step S221 includes 0 as the response delay time.

When the process of any one of steps S205, S214, and S221 ends, the reception response setting ends. After the reception response setting ends, the control unit 101 determines the presence or absence of the video data Ready interrupt notified of by the video signal processing unit 106, and determines whether video data is ready (step S110). When the video data is not ready, the control unit 101 repeats the determination of step S110 until the video data is ready. When the video data is ready, the control unit 101 transmits a frame start notification for synchronous adjustment of the transmission/reception of video data to the video receiving terminals 200 via the wireless communication circuit unit 104 and the antenna 105 (step S111). The frame start notification is a packet for notifying of a frame start timing.

Figure 5:
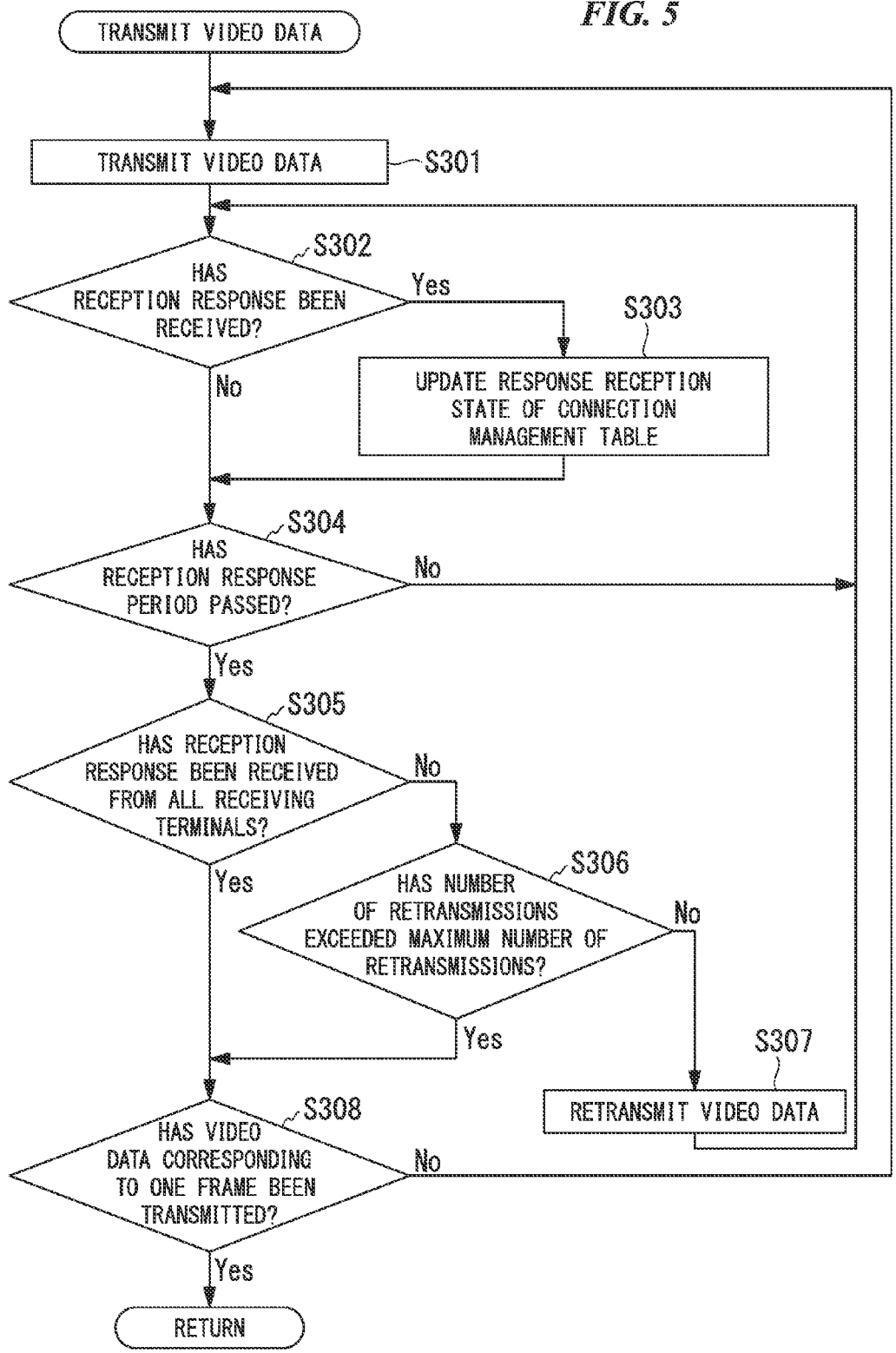
FIG. 5 is a flowchart illustrating a procedure of an operation of a video transmission terminal according to one embodiment of the present invention.

Subsequently, the control unit 101 performs a process of transmitting video data to the video receiving terminals 200 (step S112). FIG. 5 illustrates a detailed operation of the video transmission terminal 100 when transmitting the video data in step S112. In order to transmit the video data in units of packets, the control unit 101 reads video data corresponding to one packet of video data of a frame to be transmitted from the RAM 103, generates a video data packet including the read video data, and transmits the video data packet to the video receiving terminals 200 via the wireless communication circuit unit 104 and the antenna 105 in a multicast manner (step S301). In step S301, the video data packet is transmitted in multicast with destinations of all the video receiving terminals 200 registered in the connection management table.

Subsequently, the control unit 101 determines whether a reception response has been received from the video receiving terminals 200 (step S302). When the wireless communication circuit unit 104 has received the reception response via the antenna 105, the control unit 101 is notified of the content of the reception response. The reception response includes the MAC address of the video receiving terminal 200. When the reception response has been received, the control unit 101 sets the value of a response reception state correlated with a MAC address the same as the MAC address included in the reception response to 1 (step S303).

After step S303 or when no reception response has been received, the control unit 101 determines whether a time coinciding with a reception response period has passed after the video data packet is transmitted in step S301 (step S304). When the time coinciding with the reception response period has not passed, the determination in step S302 is performed again. Furthermore, when the time coinciding with the reception response period has passed, the control unit 101 determines whether the reception responses have been received from all the video receiving terminals 200 registered in the connection management table (step S305). In the connection management table, when the values of response reception states correlated with all registered MAC addresses are 1, it represents that the reception responses have been received from all the video receiving terminals 200. Furthermore, when the value of a response reception state correlated with any one of all the registered MAC addresses is 0, it represents that no reception response has been received from a video receiving terminal 200 corresponding to the MAC address.

When no reception response has been received from any one of the video receiving terminals 200, the control unit 101 determines whether the number of retransmissions of the transmitted video data has exceeded a predetermined maximum number of retransmissions (step S306). When the number of retransmissions of the video data has not exceeded the predetermined maximum number of retransmissions, the control unit 101 reads video data transmitted immediately before from the RAM 103 again, generates a video data packet including the read video data, and transmits the video data packet to the video receiving terminals 200 via the wireless communication circuit unit 104 and the antenna 105 in a multicast manner (step S307). In step S307, the video data packet is transmitted in multicast with the destinations of all the video receiving terminals 200 registered in the connection management table; however, the video data packet may be transmitted in multicast with the destinations of only video receiving terminals 200 from which no reception responses have been received. Subsequently, the determination in step S302 is performed again.

When the reception responses have been received from all the video receiving terminals 200 or when the number of retransmissions of the video data has exceeded the predetermined maximum number of retransmissions, the control unit 101 determines whether the transmission of video data corresponding to one frame has been completed (step S308). When there is untransmitted video data, the video data packet is transmitted again in step S301. Furthermore, when the transmission of the video data corresponding to one frame has been completed, video data transmission ends.

After the video data transmission ends, the control unit 101 determines whether a disconnection request has been received from the video receiving terminals 200 (step S120). The disconnection request is a packet for requesting a disconnection of a connection with respect to a connection partner of wireless communication. The disconnection request includes a MAC address of the video receiving terminal 200. When no disconnection request has been received, the control unit 101 determines whether a disconnection has been instructed by an operator based on a signal from the operation unit 107 (step S124). When the disconnection has been instructed, the control unit 101 generates a disconnection request and transmits the disconnection request to the video receiving terminals 200 via the wireless communication circuit unit 104 and the antenna 105 (step S125). In step S125, the disconnection request is transmitted to the video receiving terminals 200 having all MAC addresses registered in the connection management table. After the transmission of the disconnection request, the control unit 101 enters a state of waiting for connection requests transmitted from the video receiving terminals 200 (step S102).

Furthermore, when no disconnection has been instructed, the control unit 101 determines whether the connection request has been received (step S126). The connection request to be determined in step S126 is a connection request transmitted alter the connection request determined in step S102. When the wireless communication circuit unit 104 has received the connection request via the antenna 105, the control unit 101 is notified of the content of the connection request and the connection request response is transmitted in step S103. Furthermore, when no connection request has been received, the control unit 101 determines the presence or absence of the video data Ready interrupt notified of by the video signal processing unit 106, and determines whether video data is ready (step S127). When the video data is not ready, the determination in step S120 is performed again. Furthermore, when the video data is ready, the frame start notification is transmitted in step S111.

In step S120, when the wireless communication circuit unit 104 has received the disconnection request via the antenna 105, the control unit 101 is notified of the content of the disconnection request. The control unit 101 deletes each piece of information regarding a MAC address, a priority level, a response transmission period, and a response reception state for a video receiving terminal 200 having transmitted the disconnection request from the connection management table (step S121). Furthermore, in step S121, the control unit 101 sets the value of the use state of a response transmission period assigned to the video receiving terminal 200 having transmitted the disconnection request to 0 in the reception response management table. When no response transmission period has been assigned to the video receiving terminal 200 having transmitted the disconnection request, there is no change in the content of the reception response management table.

Subsequently, the control unit 101 confirms whether any MAC address has been registered in the connection management table and determines whether there is a video receiving terminal being connected (step S122). When any MAC address has been registered in the connection management table, it represents that there is the video receiving terminal 200 being connected, and when no MAC address has been completely registered in the connection management table, it represents that there is no video receiving terminal 200 being connected.

Figure 6:
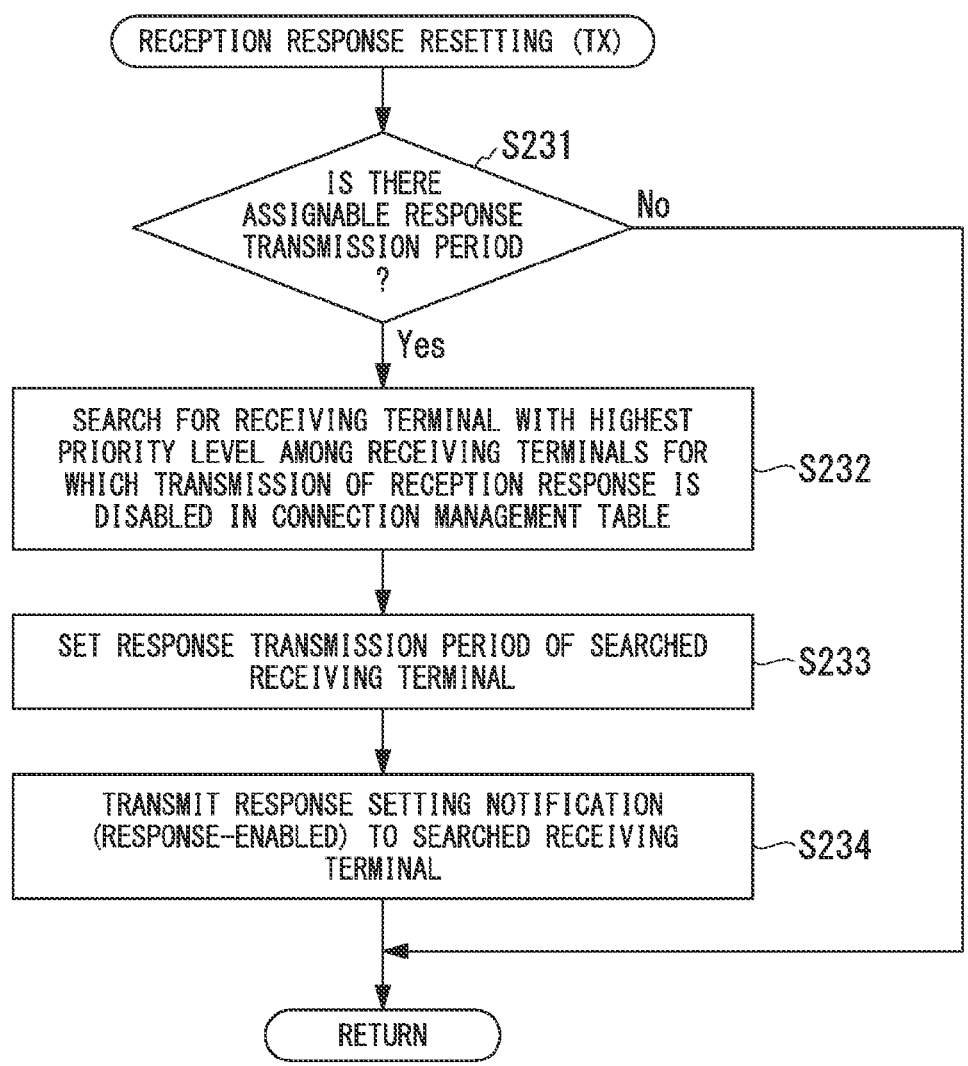
FIG. 6 is a flowchart illustrating a procedure of an operation of a video transmission terminal according to one embodiment of the present invention.
Figure 9:
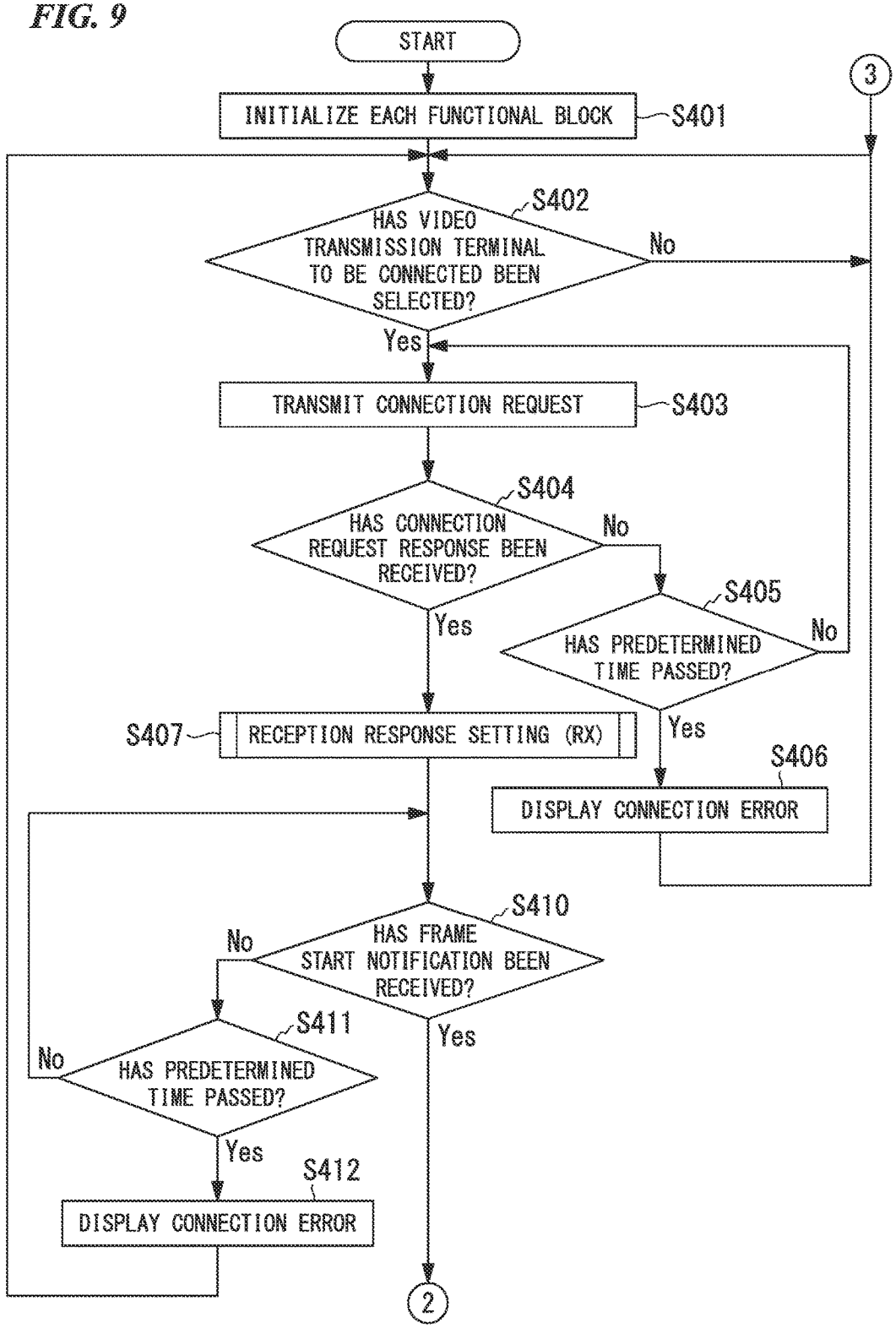
FIG. 9 is a flowchart illustrating a procedure of an operation of a video receiving terminal according to one embodiment of the present invention.

When there is no video receiving terminal 200 being connected, the control unit 101 enters a state of waiting for the reception of the connection request transmitted from the video receiving terminals 200 (step S102). Furthermore, when there is the video receiving terminal being connected, the control unit 101 performs reception response resetting to be described below (step S123). FIG. 6 illustrates a detailed operation of the video transmission terminal 100 when performing the reception response resetting in step S123. The control unit 101 determines whether there is a response transmission period assignable to the video receiving terminals 200 (step S231).

In the reception response management table, when the value of the use state correlated with the Slot_No of any one of 0 to 5 is 0, a response transmission period corresponding to the Slot_No is assignable to the video receiving terminals 200. Furthermore, in the reception response management table, when the value of the use state correlated with the Slot_No of all of 0 to 5 is 1, there is no response transmission period assignable to the video receiving terminals 200.

When there is no response transmission period assignable to the video receiving terminals 200, the reception response resetting ends. Furthermore, when there is the response transmission period assignable to the video receiving terminals 200, the control unit 101 confirms the connection management table and searches for a video receiving terminal 200 with the highest priority level among video receiving terminals 200 for which a reception response has been disabled (step S232). In step S232, in the connection management table, a video receiving terminal 200 with the smallest priority level value is searched for among video receiving terminals 200 with a response transmission period value of 0.

Subsequently, the control unit 101 sets the value of the Slot_No of a response transmission period, which is assignable to the video receiving terminals 200 in the reception response management table, in the value of a response transmission period of the video receiving terminal 200 found by the search in step S232 (step S233). Furthermore, in step S233, the control unit 101 sets the value of the use state of a response transmission period assigned to the video receiving terminal 200 to 1 in the reception response management table.

Subsequently, the control unit 101 generates a response setting notification and transmits the response setting notification to the video receiving terminal 200 found by the search in step S232 via the wireless communication circuit unit 104 and the antenna 105 (step S234). The response setting notification transmitted in step S234 includes a response delay time of the response transmission period assigned to the video receiving terminal 200 found by the search in step S232 in the reception response management table. When the wireless transmission of the response setting notification ends, the reception response resetting ends. After the reception response resetting ends, the determination in step S120 is performed again.

The processes performed by the wireless transmission terminal, which is the basic concept of the present invention, correspond to each process of step S201 (the storage of the priority), steps S204, S205, S212, and S213 (the setting of the response-enabled terminal and the response-enabled notification), steps S210, S212, S214, S220, and S221 (the setting of the response-disabled terminal and the response-disabled notification), and step S301 (the wireless transmission of the video data). Processes other than these processes are arbitrary items in the processes performed by the wireless transmission terminal, which is the basic concept of the present invention.

Next, an operation of the video receiving terminal 200 will be described. FIG. 9 to FIG. 12 illustrate the operation of the video receiving terminal 200. When the video receiving terminal 200 is powered on, the control unit 201 initializes each functional block of the video receiving terminal 200 (step S401). Subsequently, the control unit 201 detects operation content of an operator based on a signal from the operation unit 207, and waits for the selection of the video transmission terminal 100 as a connection partner by the operator (step S402). It is assumed that information of the video transmission terminal 100 selectable as the connection partner has been stored in the ROM 202 in advance. When the operator has selected the video transmission terminal 100 as the connection partner, the control unit 201 identifies the video transmission terminal 100 selected as the connection partner based on the signal from the operation unit 107. Furthermore, the control unit 201 transmits the connection request to the video transmission terminal 100 selected as the connection partner via the wireless communication circuit unit 204 and the antenna 205 (step S403). As described above, the connection request includes the MAC address and the priority level information of the video receiving terminal 200. The priority level information of the video receiving terminal 200 is stored in the ROM 202 in advance.

After the transmission of the connection request, the control unit 201 determines whether a connection request response has been received from the video transmission terminal 100 (step S404). When no connection request response has been received, the control unit 201 determines whether a time since the transmission of the connection request has exceeded a predetermined time for which the reception of the connection request response is awaited (step S405). When the time that has passed has not exceeded the predetermined time, the connection request is transmitted again in step S403. Furthermore, when the time that has passed has exceeded the predetermined time, the control unit 201 displays a connection err on the monitor 210 (step S406). After the display of the connection error, the control unit 201 waits for the selection of the video transmission terminal 100 as a connection partner by the operator in step S402.

Figure 11:
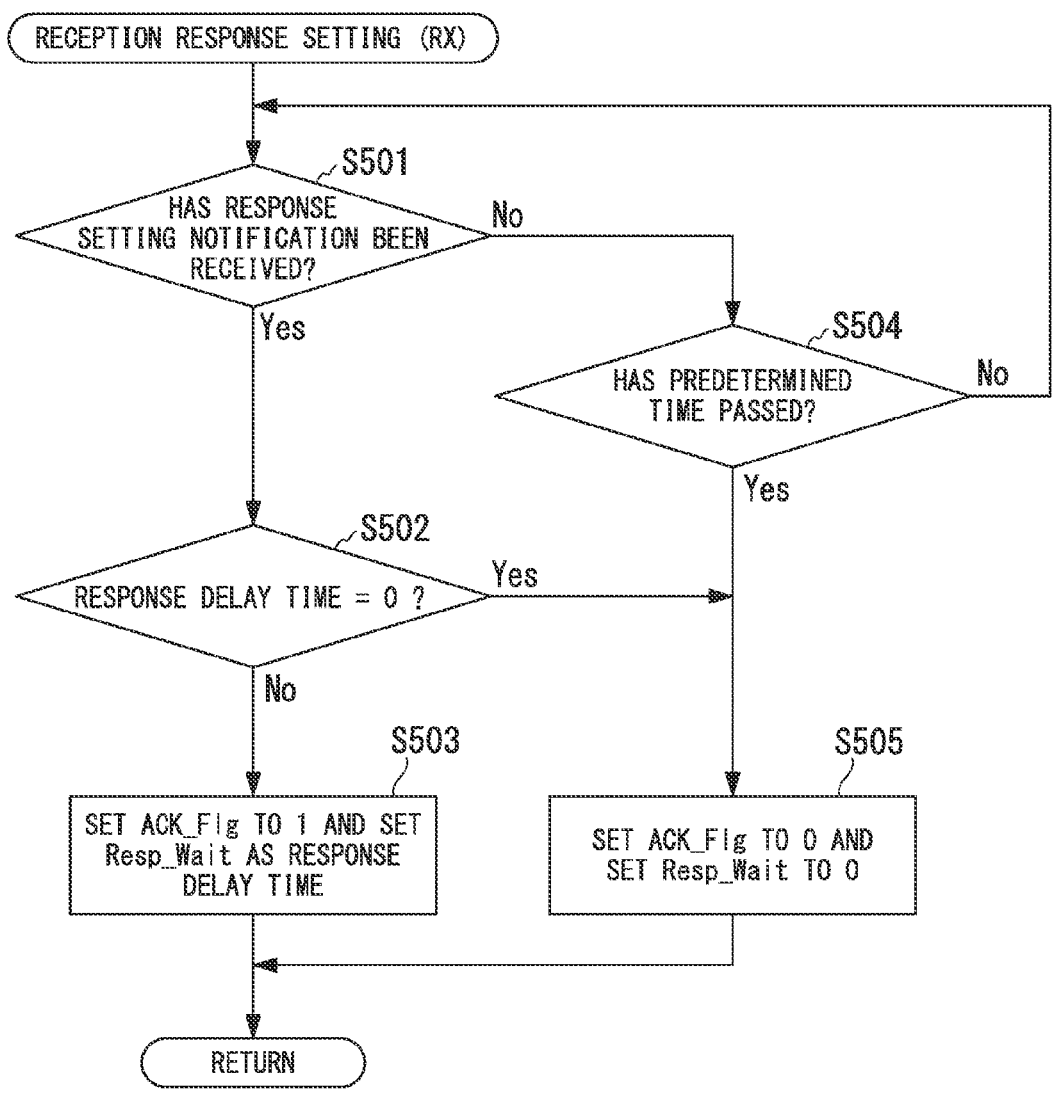
FIG. 11 is a flowchart illustrating a procedure of an operation of a video receiving terminal according to one embodiment of the present invention.

When the connection request response has been received in step S404 or the wireless communication circuit unit 204 has received the connection request response via the antenna 205, the control unit 201 is notified of the content of the connection request response and a connection with the video transmission terminal 100 is established. When the connection with the video transmission terminal 100 is established, the control unit 201 performs reception response setting to be described below (step S407). FIG. 11 illustrates a detailed operation of the video receiving terminal 200 when performing the reception response setting in step S407. The control unit 201 determines whether a response setting notification has been received from the video transmission terminal 100 (step S501).

When the wireless communication circuit unit 204 has received the response setting notification via the antenna 205, the control unit 201 is notified of the content of the response setting notification and the control unit 201 determines whether a response delay time included in the response setting notification is 0 (step S502). When the response delay time is not 0, since the response transmission period has been assigned to the video receiving terminal 200, the control unit 201 sets the value of a parameter ACK_Flg indicating whether to transmit a reception response to 1, and sets the value of a parameter Resp_Wait indicating a response delay time as a value of the response delay time included in the response setting notification (step S503). Furthermore, when the response delay time is 0, since no response transmission period has been assigned to the video receiving terminal 200, the control unit 201 sets the value of the parameter ACK_Flg indicating whether to transmit the reception response to 0, and sets the value of the parameter Resp_Wait indicating the response delay time to 0 (step S505). When the process of step S503 or step S505 is performed, the reception response setting ends.

When no response setting notification has been received in step S501, the control unit 201 determines whether the time since the transmission of the connection request has exceeded a predetermined time for which the reception of the response setting notification is awaited (step S504). When the time that has passed has not exceeded the predetermined time, the determination in step S501 is performed again. Furthermore, when the time that has passed has exceeded the predetermined lime, the respective values of the parameter ACK_Flg and the parameter Resp_Wait are set to 0 in step S505.

After the reception response setting ends, the control unit 201 determines whether the frame start notification has been received from the video transmission terminal 100 (step S410). When no frame start notification has been received, the control unit 201 determines whether the time since the transmission of the connection request has exceeded a predetermined time for which the reception of the frame start notification is awaited (step S411). When the time that has passed has not exceeded the predetermined time, the determination in step S410 is performed again. Furthermore, when the time that has passed has exceeded the predetermined time, the control unit 201 displays a connection error on the monitor 210 (step S412). After the display of the connection error, the control unit 201 waits for the selection of the video transmission terminal 100 as a connection partner by the operator in step S402.

Figure 10:
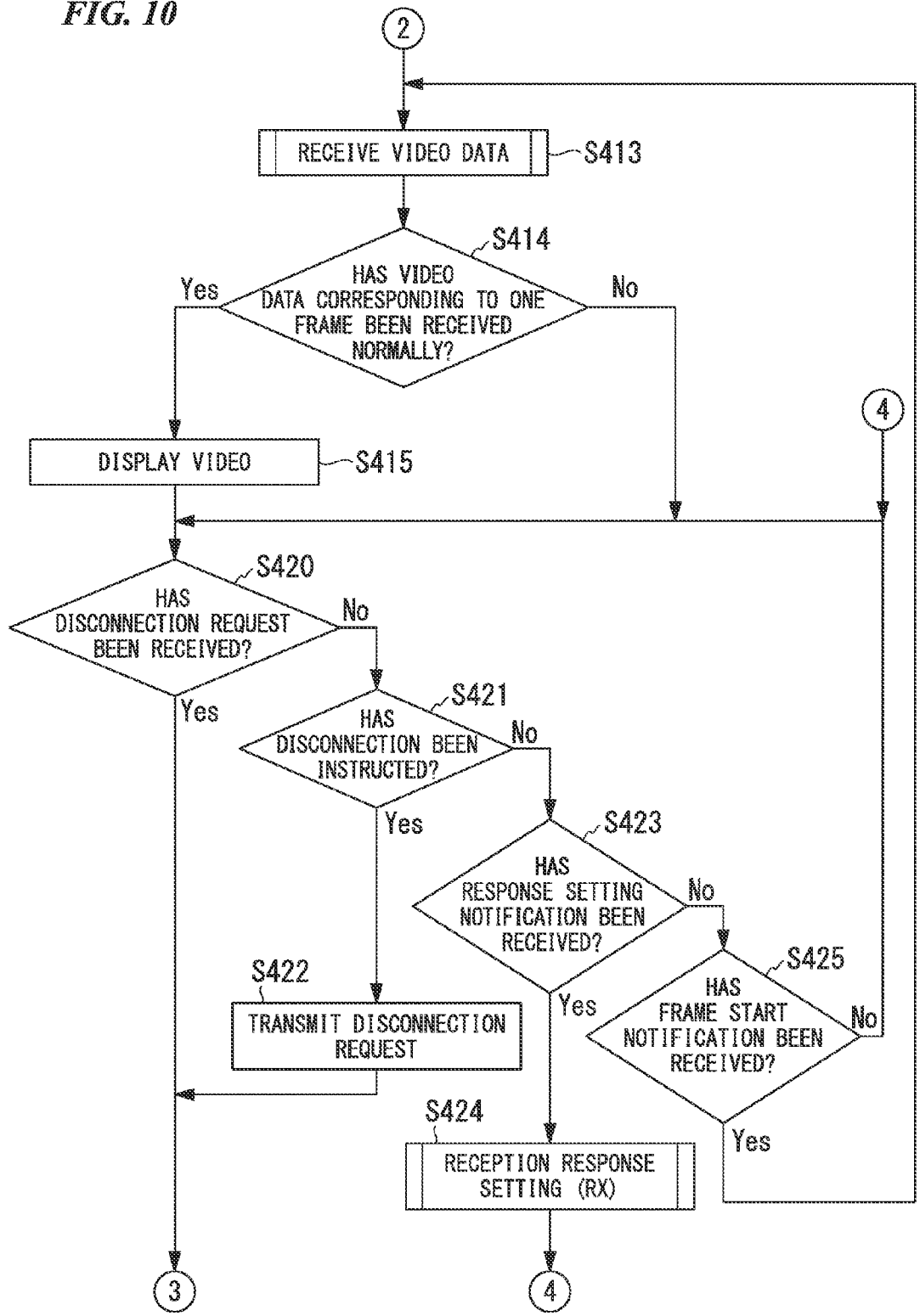
FIG. 10 is a flowchart illustrating a procedure of an operation of a video receiving terminal according to one embodiment of the present invention.
Figure 12:
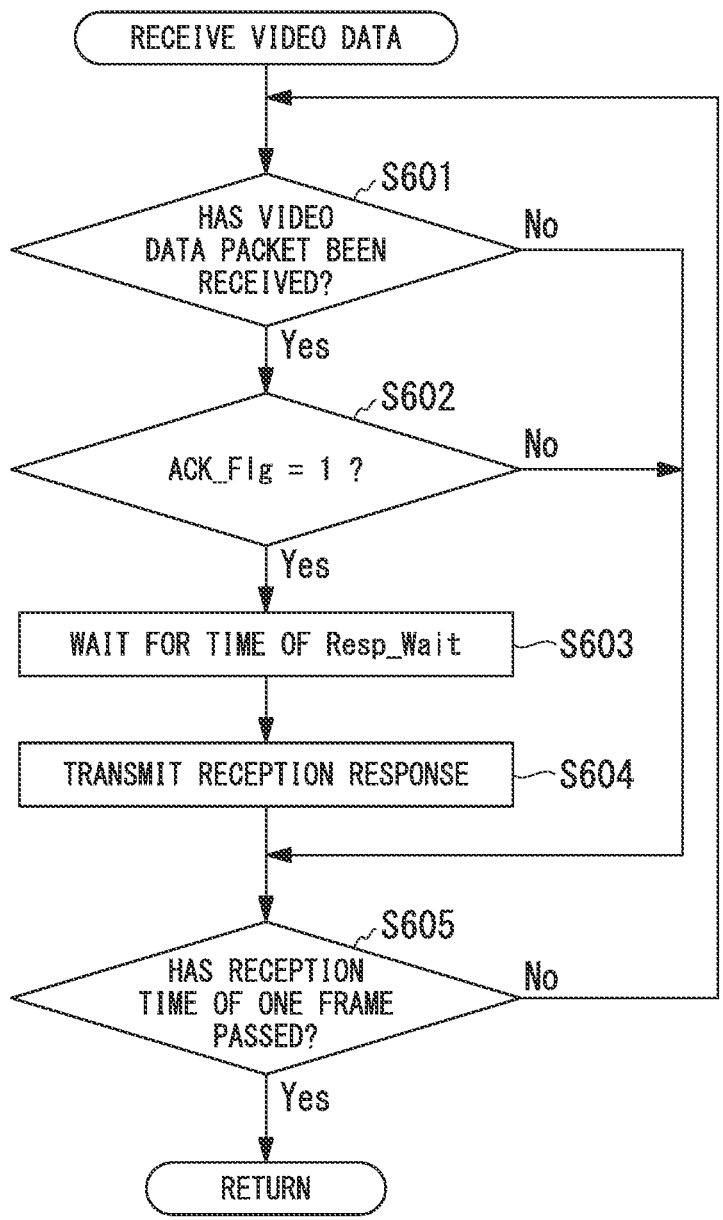
FIG. 12 is a flowchart illustrating a procedure of an operation of a video receiving terminal according to one embodiment of the present invention.

When the wireless communication circuit unit 204 has received the frame start notification via the antenna 205 in step S410, the content of the frame start notification is notified to the control unit 201. As illustrated in FIG. 10, the control unit 201 performs a process of receiving video data from the video transmission terminal 100 (step S413). FIG. 12 illustrates a detailed operation of the video receiving terminal 200 when receiving the video data in step S413. The control unit 201 determines whether a video data packet has been received from the video transmission terminal 100 (step S601). When no video data packet has been received, determination in step S605 is performed. Furthermore, when the wireless communication circuit unit 204 has received the video data packet via the antenna 205, video data included in the video data packet is stored in the RAM 203 and the control unit 201 determines whether the value of the parameter ACK_Flg is 1 (step S602).

When the value of the parameter ACK_Flg is not 1, the determination in step S605 is performed. In this case, the video data packet is received, but no reception response is transmitted. Furthermore, when the value of the parameter ACK_Flg is 1, the control unit 201 waits for a time corresponding to the value of the parameter Resp_Wait (step S603). Subsequently, the control unit 201 generates a reception response and transmits the reception response to the video transmission terminal 100 via the wireless communication circuit unit 204 and the antenna 205 (step S604).

Subsequently, the control unit 201 determines whether a predetermined time set in order to receive video data of one frame has passed (step S605). When the predetermined time has not passed, the determination in step S601 is performed again. Furthermore, when the predetermined time has passed, the video data reception ends.

After the video data reception ends, the control unit 201 determines whether the video data corresponding to one frame has been received normally (step S414). When the video data corresponding to one frame has not been received normally, determination in step S420 is performed. Furthermore, when the video data corresponding to one frame has been received normally, the control unit 201 combines data of each video data packet to generate the video data corresponding to one frame, allows the video signal processing unit 206 to process the video data and allows a video based on the video data to be displayed on the monitor 210 (step S415).

Subsequently, the control unit 201 determines whether a disconnection request has been received from the video transmission terminal 100 (step S420). When the wireless communication circuit unit 204 has received the disconnection request via the antenna 205, the control unit 201 is notified of the content of the disconnection request and the control unit 201 waits for the selection of the video transmission terminal 100 as a connection partner by the operator in step S402. Furthermore, when no disconnection request has been received, the control unit 201 determines whether a disconnection has been instructed by the operator based on a signal from the operation unit 207 (step S421). When the disconnection has been instructed, the control unit 201 generates a disconnection request and transmits the disconnection request to the video transmission terminal 100 via the wireless communication circuit unit 204 and the antenna 205 (step S422). After the transmission of the disconnection request, the control unit 201 waits for the selection of the video transmission terminal 100 as a connection partner by the operator in step S402.

Furthermore, when no disconnection has been instructed, the control unit 201 determines whether a response setting notification has been received from the video transmission terminal 100 (step S423). When the wireless communication circuit unit 204 has received the response setting notification via the antenna 205, the control unit 201 is notified of the content of the response setting notification and the control unit 201 performs reception response setting (step S424). The reception response setting in step S424 is similar to the reception response setting in step S407. After the reception response setting ends, the determination in step S420 is performed again.

When no response setting notification has been received, the control unit 201 determines whether a frame start notification has been received from the video transmission terminal 100 (step S425). When no frame start notification has been received, the determination in step S420 is performed again. Furthermore, when the wireless communication circuit unit 204 has received the frame start notification via the antenna 205, the control unit 201 is notified of the content of the frame start notification and the reception of the video data is performed in step S413.

The processes performed by the wireless receiving terminal, which is the basic concept of the present invention, correspond to each process of step S403 (the wireless transmission of the connection request), step S604 (the wireless transmission of the response), and the transition (control for preventing the wireless transmission of the response) from step S601 to step S605. Processes other than these processes are arbitrary items in the processes performed by the wireless receiving terminal, which is the basic concept of the present invention.

Next, an example of transition of the connection management table and the reception response management table according to the aforementioned operation will be described. The following transition of each table will be described by employing the case in which the state of the connection management table is the state illustrated in FIG. 7 and the state of the reception response management table is the state illustrated in FIG. 8 as an example. As illustrated in FIG. 7, connection requests are received in the video transmission terminal 100 from a video receiving terminal 200 with a MAC address of MAC_a and a priority level of 1 (priority: high) and a video receiving terminal 200 with a MAC address of MAC_b and a priority level of 3 (priority: low), and information of these video receiving terminals 200 is registered in the connection management table. Furthermore, as illustrated in FIG. 8, response transmission periods with the Slot_No of 1 and 2 are assigned to these video receiving terminals 200.

Subsequently, as illustrated in FIG. 13, a connection request is received in the video transmission terminal 100 from a video receiving terminal 200 with a MAC address of MAC_c and a priority level of 2 (priority: intermediate), and information of the video receiving terminal 200 is registered in the connection management table (corresponding to step S201). As illustrated in FIG. 8, in an immediately previous state, since the response transmission periods are assigned to two video receiving terminals 200 and there are assignable response transmission periods (corresponding to step S203), a response transmission period with the Slot_No of 3 is assigned as illustrated in FIG. 14.

Subsequently, as illustrated in FIG. 15, connection requests are received in the video transmission terminal 100 from a video receiving terminal 200 with a MAC address of MAC_d and a priority level of 2 and a video receiving terminal 200 with a MAC address of MAC_e and a priority level of 3, and information of the video receiving terminal 200 is registered in the connection management table. Furthermore, as illustrated in FIG. 16, response transmission periods with the Slot_No of 4 and 5 are assigned to these video receiving terminals 200. When the response transmission periods are assigned to five video receiving terminals 200, there are no assignable response transmission periods.

Figure 17:
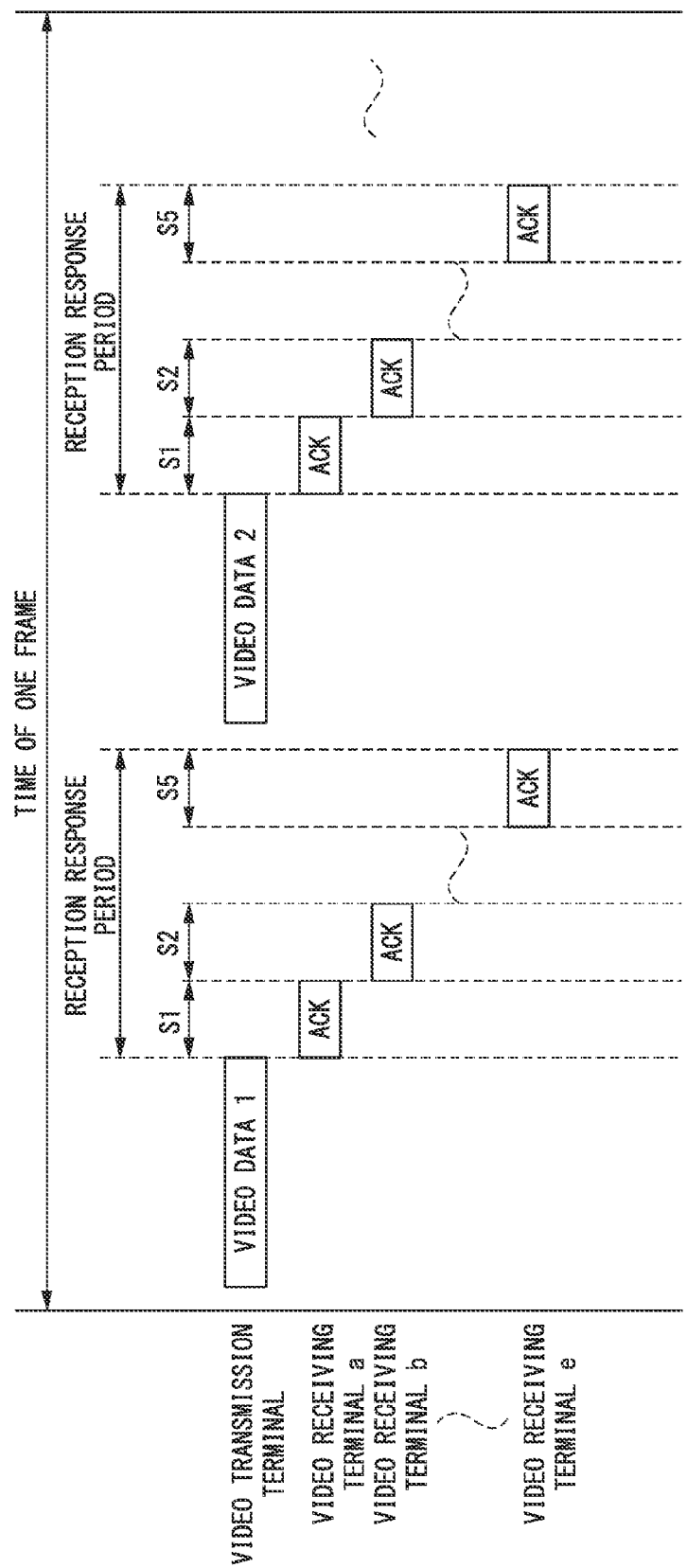
FIG. 17 is a timing chart illustrating an aspect of video data transmission in one embodiment of the present invention.

FIG. 17 illustrates an aspect in which video data is transmitted from the video transmission terminal 100 to five video receiving terminals 200 (illustrated as video receiving terminals a to e in FIG. 17). The right direction of FIG. 17 is a direction in which time passes. The video data transmitted from the video transmission terminal 100 is divided into a plurality of pieces of video data, and each divided piece of video data is wirelessly transmitted within the time of one frame in a time division scheme and in a multicast manner. Each of video data 1 and video data 2 of FIG. 17 is video data transmitted by one video data packet.

The video receiving terminals 200 having received the video data transmit reception responses (ACK) to the video transmission terminal 100 in response transmission periods (S1, S2, . . . , and Sn), which have been assigned to the respective video receiving terminals 200, in a reception response period. Timings at which the respective video receiving terminals 200 transmit the reception responses are times corresponding to the response delay times of the reception response management table. The video transmission terminal 100 receives the reception responses from the video receiving terminals 200 and performs reception confirmation.

Thereafter, as illustrated in FIG. 18, a connection request is received in the video transmission terminal 100 from a video receiving terminal 200 with a MAC address of MAC_f and a priority level of 2, and information of the video receiving terminal 200 is registered in the connection management table. However, since there are no assignable response transmission periods (corresponding to step S203), a response transmission period assigned to a video receiving terminal 200 with the lowest priority level (a MAC address: MAC_b) is assigned to a video receiving terminal 200 (a MAC address: MAC_f) having transmitted a newly received connection request (corresponding to step S212). As a result, as illustrated in FIG. 18, the value of the response transmission period of the video receiving terminal 200 with the lowest priority level (a MAC address: MAC_b) is 0 and the value of the response transmission period of the video receiving terminal 200 (the MAC address: MAC_f) having transmitted the newly received connection request is 2.

Figure 19:
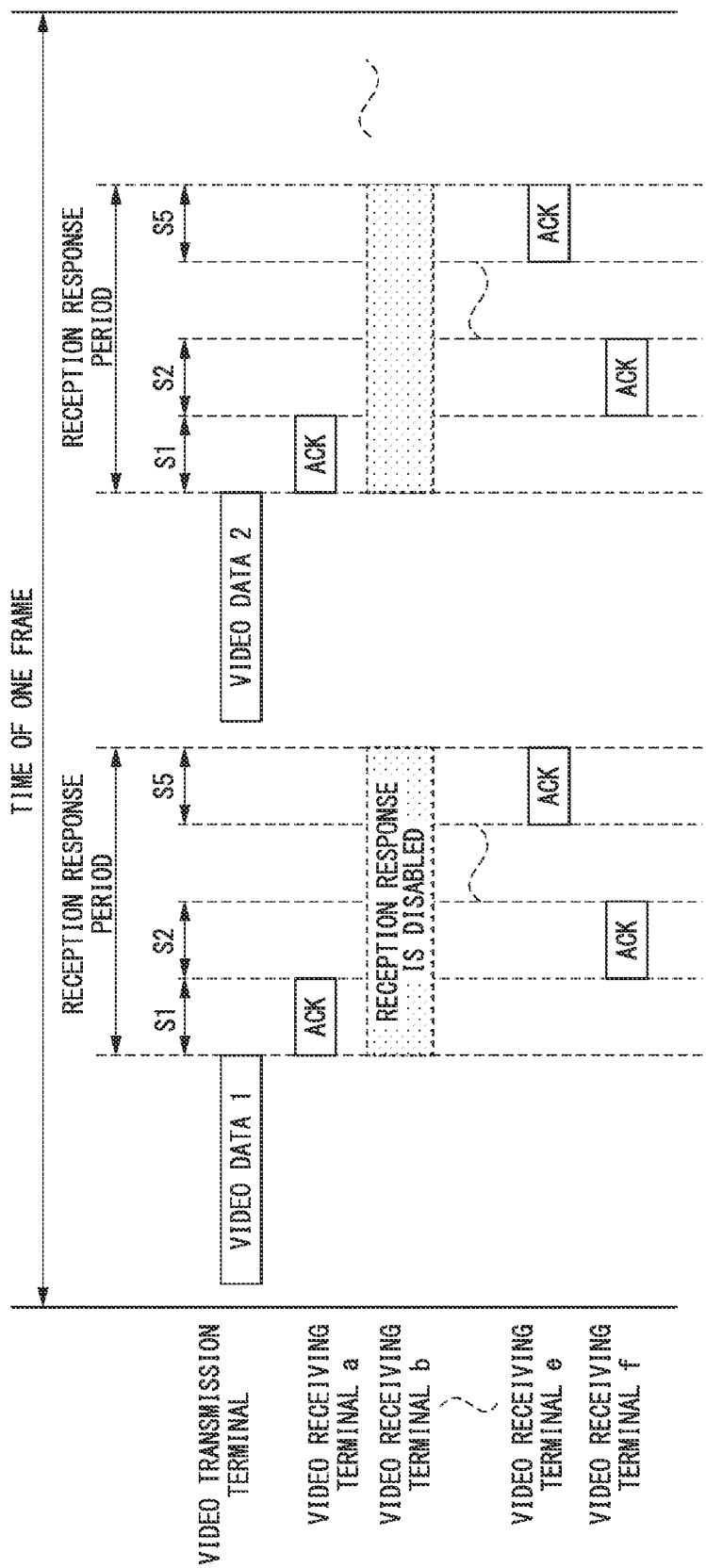
FIG. 19 is a timing chart illustrating an aspect of video data transmission in one embodiment of the present invention.

FIG. 19 illustrates an aspect in which video data is transmitted from the video transmission terminal 100 to six video receiving terminals 200 (illustrated as video receiving terminals a to f in FIG. 19). The right direction of FIG. 19 is a direction in which time passes. In FIG. 19, since the video receiving terminal b receives video data 1 but is disabled from transmitting a reception response, no reception response is transmitted. On the other hand, the video receiving terminal f transmits a reception response in a response transmission period (S2 of FIG. 19) assigned to the video receiving terminal b.

Thereafter, as illustrated in FIG. 20, a connection request is received in the video transmission terminal 100 from a video receiving terminal 200 with a MAC address of MAC_g and a priority level of 2, and information of the video receiving terminal 200 is registered in the connection management table. However, since there me no assignable response transmission periods (corresponding to step S203), a response transmission period assigned to a video receiving terminal 200 with the lowest priority level (a MAC address: MAC_e) is assigned to a video receiving terminal 200 (the MAC address: MAC_g) having transmitted a newly received connection request (corresponding to step S212). That is, as illustrated in FIG. 20, the value of the response transmission period of the video receiving terminal 200 with the lowest priority level (the MAC address: MAC_e) is 0 and the value of the response transmission period of the video receiving terminal 200 (the MAC address: MAC) having transmitted the newly received connection request is 5.

Thereafter, when a video receiving terminal 200 with a MAC address of MAC_f transmits a disconnection request to the video transmission terminal 100, information of the video receiving terminal 200 is deleted from the connection management table (corresponding to step S121) as illustrated in FIG. 21. Moreover, as illustrated in FIG. 21, the information of the video receiving terminal 200 with the MAC address of MAC, and a priority level of 2 is moved to a position at which the deleted information was registered. Furthermore, as illustrated in FIG. 22, since the video receiving terminal 200 has been disconnected and thus a response transmission period assigned to the video receiving terminal 200 is not available, the value of the use state of a response transmission period with the Slot_No of 2 is updated to 0 in the reception response management table.

Since the video receiving terminal 200 has been disconnected and thus an assignable response transmission period is generated (corresponding to step S121), the response transmission period is assigned to a video receiving terminal 200 with the highest priority level among video receiving terminals 200 for which the transmission of a reception response is disabled (video receiving terminals 200 with a response transmission period value of 0) (corresponding to steps S232 and S233). As a result, as illustrated in FIG. 23, in the reception response management table, the value of the response transmission period of the video receiving terminal 200 with a MAC address of MAC_b and a priority level of 3 is 2. Furthermore, as illustrated in FIG. 24, in the reception response management table, the value of the use state of the response transmission period with the Slot_No of 2 is updated to 1.

Figure 25:
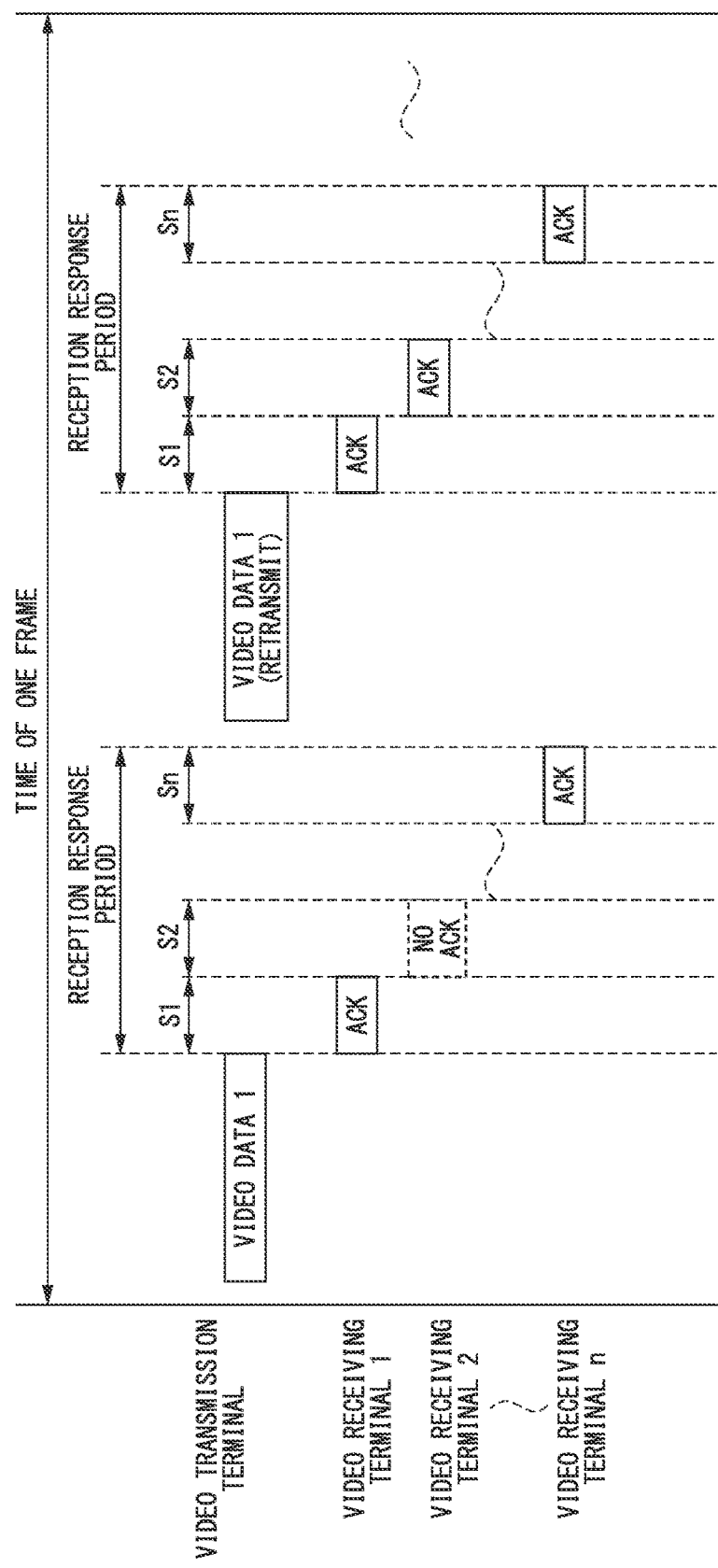
FIG. 25 is a timing chart illustrating an aspect of video data transmission in one embodiment of the present invention.

Next, one example of an operation in which the video transmission terminal 100 performs retransmission of video data will be described. FIG. 25 illustrates an aspect in which video data is transmitted from the video transmission terminal 100 to an video receiving terminals 200 (illustrated as video receiving terminals 1 to n in FIG. 25). The right direction of FIG. 25 is a direction in which time passes. The video data transmitted from the video transmission terminal 100 is divided into a plurality of pieces of video data, and each divided piece of video data is wirelessly transmitted within the time of one frame in a time division scheme and in a multicast manner. Video receiving terminals 200 having received the video data transmit reception responses (ACK) to the video transmission terminal 100 in response transmission periods (S1, S2, . . . , and Sn), which have been assigned to the respective video receiving terminals 200, in a reception response period. The video transmission terminal 100 receives the reception responses from the video receiving terminals 200 and performs reception confirmation.

FIG. 25 illustrates an aspect in which, when video data 1 has been transmitted from the video transmission terminal 100, the video data is not received in one video receiving terminal 200 (a video receiving terminal 2 in FIG. 25) and no reception response is transmitted from the video receiving terminal 200. Since no reception response has been received from on video receiving terminal 200, the video transmission terminal 100 retransmits the video data 1. FIG. 25 illustrates an aspect in which the retransmitted video data 1 is received in all the video receiving terminals 200 and reception responses are transmitted from all the video receiving terminals 200.

As described above, according to the present embodiment, the video receiving terminal 200 serves as a response-enabled terminal or a response-disabled terminal in response to a priority level of the video receiving terminal 200, and the video receiving terminal 200 serving as the response-disabled terminal is disabled from wirelessly transmitting a reception response. The number of response-enabled terminals is held to be equal to or less than an upper limit, so that a video data transmission period and a reception response period can be respectively ensured as constant periods and thus video data transmission efficiency can be maintained. Furthermore, both the response-enabled terminal and the response-disabled terminal can wirelessly receive video data from the video transmission terminal 100, so that many more video receiving terminals 200 can connect to the video transmission terminal 100 to wirelessly receive the video data. That is, a limitation of the number of video receiving terminals 200 connectable to the video transmission terminal 100 can be reduced. Moreover, a video receiving terminal 200 with a higher priority level serves as a response-enabled terminal, so that it is possible to improve the reliability of video data received in the video receiving terminal 200 with a higher priority level.

Furthermore, when a video receiving terminal 200 having transmitted a disconnection request is a response-enabled terminal, a video receiving terminal 200 with a higher priority level is selected from among video receiving terminals 200 registered as response-disabled terminals (video receiving terminals 200 with a response transmission period value of 0) and is changed to the response-enabled terminal, so that it is possible to improve the reliability of video data received in many more video receiving terminals 200.

So far, embodiments of the present invention have been described with reference to the accompanying drawings. However, detailed configurations are not limited to the above-mentioned embodiments. The present invention may be subject to design modification in a range not departing from the spirit of the present invention. For example, in the aforementioned embodiments, an example in which the present invention is applied to a wireless communication technology of video data has been described. However, the present invention can be applied to a wireless communication technology of various types of data other than the video data.

The present invention can be widely applied to a wireless transmission terminal, a wireless receiving terminal, a wireless communication system, a wireless communication method, and a program for performing the method, and enables many more wireless receiving terminals to wirelessly receive data while maintaining data transmission efficiency.

What is claimed is:

1. A wireless transmission terminal, which wirelessly transmits data in a multicast manner to wireless receiving terminals that set whether to wirelessly transmit ACK responses for wirelessly received data, wirelessly transmit priority information representing a priority of a reception side terminal, and serve as any one of ACK response-enabled terminals for which wireless transmission of the ACK responses is enabled and ACK response-disabled terminals for which wireless transmission of the ACK responses is disabled, comprising:

a wireless communication unit;

a storage unit configured to store an upper limit number of the ACK response-enabled terminals; and a control unit configured to store the priority information in the storage unit in correlation with identification information for identifying the wireless receiving terminal having wirelessly transmitted a connection request for receiving data wirelessly transmitted in a multicast manner when the connection request and the priority information have been wirelessly received in the wireless communication unit, the connection request and the priority information being transmitted from the wireless receiving terminals, to store information representing that the wireless receiving terminal having wirelessly transmitted the connection request is the ACK response-enabled terminal in the storage unit in correlation with the identification information, and allow ACK response-enabled notification information for notifying that the wireless receiving terminal is the ACK response-enabled terminal to be wirelessly transmitted from the wireless communication unit to the wireless receiving terminal when a number of the ACK response-enabled terminals does not reach the upper limit number at a time point at which the connection request is wirelessly received in the wireless communication unit, to select a wireless receiving terminal with a priority lower than the priorities of other wireless receiving terminals from among the wireless receiving terminals stored in the storage unit as the ACK response-enabled terminals and the wireless receiving terminal having transmitted the connection request based on the priority information stored in the storage unit, store information representing that the selected wireless receiving terminal is the ACK response-disabled terminal in the storage unit in correlation with the identification information, and allow ACK response-disabled notification information for notifying that the selected wireless receiving terminal is the ACK response-disabled terminal to be wirelessly transmitted from the wireless communication unit to the selected wireless receiving terminal when the number of the ACK response-enabled terminals reaches the upper limit number at the time point at which the connection request is wirelessly received in the wireless communication unit, and to allow data to be wirelessly transmitted in a multicast manner from the wireless communication unit to the wireless receiving terminals stored in the storage unit as the ACK response-enabled terminals and the wireless receiving terminals stored in the storage unit as the response-disabled terminals, wherein transmission of the ACK response-enabled notification information and the ACK response-disabled notification information is performed only before the multicast data transmission which includes video data.

2. The wireless transmission terminal according to claim 1, wherein the control unit sets different response transmission periods in each of the ACK response-enabled terminals such that the ACK responses are wirelessly transmitted from each of the ACK response-enabled terminals in a time division scheme, and allows information representing the response transmission periods to be wirelessly transmitted from the wireless communication unit to each of the ACK response-enabled terminals.

3. The wireless transmission terminal according to claim 2, wherein, after the response transmission periods set for all the ACK response-enabled terminals pass, when there is an ACK response-enabled terminal from which an ACK response is not wirelessly received in the wireless communication unit, the control unit allows the data to be retransmitted from the wireless communication unit in a multicast manner.

4. The wireless transmission terminal according to claim 2, wherein, when the number of the ACK response-enabled terminals does not reach the upper limit number at the time point at which the connection request is wirelessly received in the wireless communication unit, the control unit allows the information representing the response transmission periods to be wirelessly transmitted from the wireless communication unit to the wireless receiving terminal having wirelessly transmitted the connection request.

5. The wireless transmission terminal according to claim 2, wherein, when a disconnection request for requesting a disconnection of a wireless connection has been wirelessly received in the wireless communication unit from the wireless receiving terminal if the wireless receiving terminal having transmitted the disconnection request has been stored in the storage unit as the ACK response-enabled terminal, the control unit selects, as the ACK response-enabled terminal, a wireless receiving terminal with a priority higher than a priority of the wireless receiving terminal having transmitted the disconnection request from among the wireless receiving terminals stored in the storage unit as the ACK response-disabled terminals based on the priority information stored in the storage unit, stores information representing that the selected wireless receiving terminal is the ACK response-enabled terminal in the storage unit in correlation with the identification information, and allows the ACK response-enabled notification information to be wirelessly transmitted from the wireless communication unit to the selected wireless receiving terminal.

6. The wireless transmission terminal according to claim 5, wherein, when the ACK response-enabled notification information is allowed to be wirelessly transmitted from the wireless communication unit, the control unit allows the information representing the response transmission periods to be wirelessly transmitted from the wireless communication unit.

7. A wireless receiving terminal, which wirelessly receives data wirelessly transmitted in a multicast manner from a wireless transmission terminal that wirelessly transmits data in a multicast manner, wirelessly receives priority information representing a priority of a reception side terminal, and sets an ACK response-enabled terminal for which wireless transmission of an ACK response for wirelessly received data is enabled and an ACK response-disabled terminal for which wireless transmission of an ACK response for wirelessly received data is disabled, comprising:

a storage unit configured to store the priority information;
a wireless communication unit configured to wirelessly transmit a connection request for receiving data and the priority information stored in the storage unit to the wireless transmission terminal, and wirelessly receive data wirelessly transmitted from the wireless transmission terminal in a multicast manner; and
a control unit configured to allow an ACK response to be wirelessly transmitted from the wireless communication unit when data from the wireless transmission terminal has been wirelessly received in the wireless communication unit in a case in which ACK response-enabled notification information for notifying of the ACK response-enabled terminal has been wirelessly received in the wireless communication unit and prevent the ACK response from being wirelessly transmitted from the wireless communication unit when data from the wireless transmission terminal has been wirelessly received in the wireless communication unit in a case in which ACK response-disabled notification information for notifying of the ACK response-disabled terminal has been wirelessly received in the wireless communication unit,
wherein transmission of the ACK response-enabled notification information and the ACK response-disabled notification information is performed only before the multicast data transmission which includes video data,
wherein, when response transmission period information representing a response transmission period has been wirelessly received in the wireless communication unit together with the ACK response-enabled notification information, the control unit allows the ACK response to be wirelessly transmitted from the wireless communication unit in the response transmission period based on the response transmission period information.

8. A wireless communication system, which includes a wireless transmission terminal that wirelessly transmits data in a multicast manner and wireless receiving terminals that wirelessly receive data wirelessly transmitted from the wireless transmission terminal in a multicast manner, set whether to wirelessly transmit ACK responses for wirelessly received data, wirelessly transmit priority information representing a priority of a reception side terminal, and serve as any one of ACK response-enabled terminals for which wireless transmission of the ACK responses is enabled and ACK response-disabled terminals for which wireless transmission of the ACK responses is disabled, wherein the wireless transmission terminal comprises:

a first wireless communication unit;
a first storage unit configured to store an upper limit number of the ACK response-enabled terminals; and
a first control unit configured to store the priority information in the first storage unit in correlation with identification information for identifying the wireless receiving terminal having wirelessly transmitted a connection request for receiving data wirelessly transmitted in a multicast manner when the connection request and the priority information have been wirelessly received in the first wireless communication unit the connection request and the priority information being transmitted from the wireless receiving terminals,
to store information representing that the wireless receiving terminal having wirelessly transmitted the connection request is the ACK response-enabled terminal in the first storage unit in correlation with the identification information, and allow ACK response-enabled notification information for notifying that the wireless receiving terminal is the ACK response-enabled terminal to be wirelessly transmitted from the first wireless communication unit to the wireless receiving terminal when a number of the ACK response-enabled terminals does not reach the upper limit number at a time point at which the connection request is wirelessly received in the first wireless communication unit,
to select a wireless receiving terminal with a priority lower than the priorities of other wireless receiving terminals from among the wireless receiving terminals stored in the first storage unit as the ACK response-enabled terminals and the wireless receiving terminal having transmitted the connection request based on the priority information stored in the first storage unit, store information representing that the selected wireless receiving terminal is the ACK response-disabled terminal in the first storage unit in correlation with the identification information, and allow ACK response-disabled notification information for notifying that the selected wireless receiving terminal is the ACK response-disabled terminal to be wirelessly transmitted from the first wireless communication unit to the selected wireless receiving terminal when the number of the ACK response-enabled terminals reaches the upper limit number at the time point at which the connection request is wirelessly received in the first wireless communication unit, and to allow data to be wirelessly transmitted in a multicast manner from the first wireless communication unit to the wireless receiving terminals stored in the first storage unit as the ACK response-enabled terminals and the wireless receiving terminals stored in the first storage unit as the ACK response-disabled terminals, and the wireless receiving terminal comprises:

a second storage unit configured to store the priority information;

a second wireless communication unit configured to wirelessly transmit a connection request and the priority information stored in the second storage unit to the wireless transmission terminal and wirelessly receive data wirelessly transmitted from the wireless transmission terminal in a multicast manner; and a second control unit configured to allow an ACK response to be wirelessly transmitted from the second wireless communication unit when data from the wireless transmission terminal has been wirelessly received in the second wireless communication unit in a case in which ACK response-enabled notification information for notifying of the ACK response-enabled terminal has been wirelessly received in the second wireless communication unit and prevent the ACK response from being wirelessly transmitted from the second wireless communication unit when data from the wireless transmission terminal has been wirelessly received in the second wireless communication unit in a case in which ACK response-disabled notification information for notifying of the ACK response-disabled terminal has been wirelessly received in the second wireless communication unit, wherein transmission of the ACK response-enabled notification information and the ACK response-disabled notification information is performed only before the multicast data transmission which includes video data.

9. A computer readable storage device saving a computer program for causing a computer of a wireless transmission terminal, which includes a wireless communication unit for wirelessly transmitting data in a multicast manner to wireless receiving terminals that set whether to wirelessly transmit ACK responses for wirelessly received data, wirelessly transmit priority information representing a priority of a reception side terminal, and serve as any one of ACK response-enabled terminals for which wireless transmission of the ACK responses is enabled and ACK response-disabled terminals for which wireless transmission of the ACK responses is disabled and a storage unit for storing an upper limit number of the ACK response-enabled terminals, to perform:

a step of storing the priority information in the storage unit in correlation with identification information for identifying the wireless receiving terminal having wirelessly transmitted a connection request for receiving data wirelessly transmitted in a multicast manner when the connection request and the priority information have been wirelessly received in the wireless communication unit, the connection request and the priority information being transmitted from the wireless receiving terminals;

a step of storing information representing that the wireless receiving terminal having wirelessly transmitted the connection request is the ACK response-enabled terminal in the storage unit in correlation with the identification information, and allowing ACK response-enabled notification information for notifying that the wireless receiving terminal is the ACK response-enabled terminal to be wirelessly transmitted from the wireless communication unit to the wireless receiving terminal when a number of the ACK response-enabled terminals does not reach the upper limit number at a time point at which the connection request is wirelessly received in the wireless communication unit;

a step of selecting a wireless receiving terminal with a priority lower than the priorities of other wireless receiving terminals from among the wireless receiving terminals stored in the storage unit as the ACK response-enabled terminals and the wireless receiving terminal having transmitted the connection request based on the priority information stored in the storage unit, storing information representing that the selected wireless receiving terminal is the ACK response-disabled terminal in the storage unit in correlation with the identification information, and allowing ACK response-disabled notification information for notifying that the selected wireless receiving terminal is the ACK response-disabled terminal to be wirelessly transmitted from the wireless communication unit to the selected wireless receiving terminal when the number of the ACK response-enabled terminals reaches the upper limit number at the time point at which the connection request is wirelessly received in the wireless communication unit; and a step of allowing data to be wirelessly transmitted in a multicast manner from the wireless communication unit to the wireless receiving terminals stored in the storage unit as the ACK response-enabled terminals and the wireless receiving terminals stored in the storage and as the ACK response-disabled terminals, wherein transmission of the ACK response-enabled notification information and the ACK response-disabled notification information is performed only before the multicast data transmission which includes video data.

10. A computer readable storage device saving a computer program for causing a computer of a wireless receiving terminal which includes a wireless communication unit for wirelessly receiving data wirelessly transmitted in a multicast manner from a wireless transmission terminal that wirelessly transmits data in a multicast manner, wirelessly receives priority information representing a priority of a reception side terminal, and sets an ACK response-enabled terminal for which wireless transmission of an ACK response for wirelessly received data is enabled and an ACK response-disabled terminal for which wireless transmission of an ACK response for wirelessly received data is disabled and a storage unit for storing the priority information, to perform:

a step of wirelessly transmitting a connection request for receiving data and the priority information stored in the storage unit to the wireless transmission terminal;

a step of allowing an ACK response to be wirelessly transmitted from the wireless communication unit when data from the wireless transmission terminal has been wirelessly received in the wireless communication unit in a case in which ACK response-enabled notification information for notifying of the ACK response-enabled terminal has been wirelessly received in the wireless communication unit; and a step of preventing the ACK response from being wirelessly transmitted from the wireless communication unit when data from the wireless transmission terminal has been wirelessly received in the wireless communication unit in a case in which ACK response-disabled notification information for notifying of the ACK response-disabled terminal has been wirelessly received in the wireless communication unit, wherein transmission of the ACK response-enabled notification information and the ACK response-disabled notification information is performed only before the multicast data transmission which includes video data.

* * * * *